United States Patent
Nam et al.

(10) Patent No.: US 12,096,449 B2
(45) Date of Patent: Sep. 17, 2024

(54) CONFIGURED GRANT SCHEDULING REQUEST

(71) Applicant: QUALCOMM Incorporated, San Diego, CA (US)

(72) Inventors: Wooseok Nam, San Diego, CA (US); Linhai He, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 457 days.

(21) Appl. No.: 17/406,039

(22) Filed: Aug. 18, 2021

(65) Prior Publication Data

US 2022/0061084 A1 Feb. 24, 2022

Related U.S. Application Data

(60) Provisional application No. 63/068,252, filed on Aug. 20, 2020.

(51) Int. Cl.
*H04W 72/23* (2023.01)
*H04W 72/21* (2023.01)

(52) U.S. Cl.
CPC ........... *H04W 72/23* (2023.01); *H04W 72/21* (2023.01)

(58) Field of Classification Search
CPC .............................. H04W 72/21; H04W 72/23
See application file for complete search history.

(56) References Cited

U.S. PATENT DOCUMENTS

| | | | |
|---|---|---|---|
| 2020/0296759 A1* | 9/2020 | Agiwal | H04L 1/1822 |
| 2020/0344818 A1* | 10/2020 | Höglund | H04W 72/23 |
| 2021/0227517 A1* | 7/2021 | Yi | H04W 72/23 |
| 2022/0070914 A1* | 3/2022 | Zhao | H04L 5/0044 |
| 2022/0086891 A1* | 3/2022 | Baek | H04W 72/21 |
| 2022/0150748 A1* | 5/2022 | Jo | H04W 28/0268 |
| 2022/0369187 A1* | 11/2022 | Ganesan | H04W 36/06 |
| 2023/0044594 A1* | 2/2023 | Wang | H04L 1/1822 |
| 2023/0309161 A1* | 9/2023 | Rao | H04L 5/0048 |

* cited by examiner

*Primary Examiner* — Mohammad S Adhami

(74) *Attorney, Agent, or Firm* — Holland & Hart LLPQualcomm Incorporated

(57) ABSTRACT

Methods, systems, and devices for wireless communications are described. A user equipment (UE) may determine a recommended configuration for a configured grant that is to be received, at least in part, via radio resource control messaging. The UE may transmit, to a base station, one or more messages indicating the recommended configuration for the configured grant at the UE. The one or more messages may include at least one of a configured grant-specific scheduling request or a configured grant-specific control element. In some cases, at least one of the configured grant-specific scheduling request or the configured grant-specific control element may be formatted for association with grants that are received, at least in part, via radio resource control messaging. The UE may receive, from the base station, a configuration for the configured grant based on the recommended configuration.

30 Claims, 15 Drawing Sheets

CONFIGURED GRANT SCHEDULING REQUEST

CROSS REFERENCE

The present Application for Patent claims the benefit of U.S. Provisional Patent Application No. 63/068,252 by NAM et al., entitled "CONFIGURED GRANT SCHEDULING REQUEST," filed Aug. 20, 2020, assigned to the assignee hereof, and expressly incorporated by reference herein.

FIELD OF TECHNOLOGY

The following relates to wireless communications, including a configured grant scheduling request.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support a configured grant-specific scheduling request. Generally, the described techniques provide for an efficient configured grant scheme which configures a user equipment (UE) with a configured grant based on uplink traffic characteristics. A UE may indicate a recommended configuration for a configured grant, such that a configured grant for the UE can be more efficient given the uplink channel characteristics at the UE. In some cases, the UE may send a configured grant-specific message to the base station to indicate the recommended configuration based on uplink traffic characteristics, and the base station may determine, activate, update, or deactivate, a configured grant for the UE based on the indication. In some cases, UE may send a configured grant-specific scheduling request to the base station. Additionally, or alternatively, the UE may send a configured grant-specific control element to the base station. In some cases, the control element may indicate an entry of a table with multiple configured grants configurations, and the UE may select one or more recommended configurations from the table. Additionally, or alternatively, the UE may send a configured grant-specific Radio Resource Control (RRC) message to indicate the recommended configuration.

The base station may receive the indication and activate, deactivate, or modify a configured grant in response. In some cases, the base station may activate the configured grant if the configured grant is not active. In some cases, the base station may modify parameters for an active configured grant based on receiving the indication of the recommended configuration. In some examples, the base station may deactivate a configured grant and reactivate the configured grant based on a recommended configuration. In some cases, the UE may request to deactivate a configured grant, and the base station may deactivate the configured grant. By implementing these techniques, the UE may be configured with a more efficient configured grant which may align closer to the actual uplink traffic characteristics at the UE.

A method of wireless communications at a UE is described. The method may include determining, at the UE, a recommended configuration for a configured grant that is to be received, at least in part, via RRC messaging, transmitting, to a base station, one or more messages indicating the recommended configuration for the configured grant at the UE, the one or more messages including at least one of a configured grant-specific scheduling request or a configured grant-specific control element, at least one of the configured grant-specific scheduling request or the configured grant-specific control element being formatted for association with grants that are received, at least in part, via RRC messaging, and receiving, from the base station, a configuration for the configured grant based on the recommended configuration.

An apparatus for wireless communications at a UE is described. The apparatus may include a processor, memory coupled with the processor, and instructions stored in the memory. The instructions may be executable by the processor to cause the apparatus to determine, at the UE, a recommended configuration for a configured grant that is to be received, at least in part, via RRC messaging, transmit, to a base station, one or more messages indicating the recommended configuration for the configured grant at the UE, the one or more messages including at least one of a configured grant-specific scheduling request or a configured grant-specific control element, at least one of the configured grant-specific scheduling request or the configured grant-specific control element being formatted for association with grants that are received, at least in part, via RRC messaging, and receive, from the base station, a configuration for the configured grant based on the recommended configuration.

Another apparatus for wireless communications at a UE is described. The apparatus may include means for determining, at the UE, a recommended configuration for a configured grant that is to be received, at least in part, via RRC messaging, transmitting, to a base station, one or more messages indicating the recommended configuration for the configured grant at the UE, the one or more messages including at least one of a configured grant-specific scheduling request or a configured grant-specific control element, at least one of the configured grant-specific scheduling request or the configured grant-specific control element being formatted for association with grants that are received, at least in part, via RRC messaging, and receiving, from the base station, a configuration for the configured grant based on the recommended configuration.

A non-transitory computer-readable medium storing code for wireless communications at a UE is described. The code may include instructions executable by a processor to determine, at the UE, a recommended configuration for a configured grant that is to be received, at least in part, via RRC messaging, transmit, to a base station, one or more messages indicating the recommended configuration for the configured grant at the UE, the one or more messages including at least one of a configured grant-specific scheduling request or a configured grant-specific control element, at least one of the configured grant-specific scheduling request or the configured grant-specific control element being formatted for association with grants that are received, at least in part, via RRC messaging, and receive, from the base station, a configuration for the configured grant based on the recommended configuration.

In some examples of the method, apparatuses, and non-transitory computer-readable medium described herein, transmitting the one or more messages indicating the recommended configuration may include operations, features, means, or instructions for transmitting the configured grant-specific scheduling request indicating the recommended configuration for the configured grant, the configured grant-specific scheduling request being formatted for association with grants that may be received, at least in part, via RRC messaging.

In some examples of the method, apparatuses, and non-transitory computer-readable medium described herein, a payload for the configured grant-specific scheduling request includes the recommended configuration for the configured grant.

Some examples of the method, apparatuses, and non-transitory computer-readable medium described herein may further include operations, features, means, or instructions for transmitting a medium access control (MAC) control element (CE) including the recommended configuration, where the configured grant-specific scheduling request indicates the MAC CE may be associated with the configured grant.

In some examples of the method, apparatuses, and non-transitory computer-readable medium described herein, the MAC CE indicates an index of a recommended configured grant table corresponding to the recommended configuration.

In some examples of the method, apparatuses, and non-transitory computer-readable medium described herein, the configured grant-specific scheduling request may be transmitted on an uplink control channel, a random access channel, or both.

In some examples of the method, apparatuses, and non-transitory computer-readable medium described herein, transmitting the one or more messages indicating the recommended configuration may include operations, features, means, or instructions for transmitting a configured grant-specific MAC CE indicating the recommended configuration for the configured grant, where the configured grant-specific MAC CE may be the configured grant-specific control element, and the configured grant-specific MAC CE may be formatted for association with grants that may be received, at least in part, via RRC messaging.

In some examples of the method, apparatuses, and non-transitory computer-readable medium described herein, the configured grant-specific MAC CE includes an identifier for one or more logical channel groups corresponding to the configured grant, an index corresponding to the configured grant, a recommended grant size for the configured grant, a recommended periodicity for the configured grant, or any combination thereof.

Some examples of the method, apparatuses, and non-transitory computer-readable medium described herein may further include operations, features, means, or instructions for transmitting a scheduling request, where the configured grant-specific MAC CE indicates that the scheduling request corresponds to the configured grant.

Some examples of the method, apparatuses, and non-transitory computer-readable medium described herein may further include operations, features, means, or instructions for determining an index of a recommended configured grant table corresponding to the recommended configuration, where the configured grant-specific MAC CE includes the index.

In some examples of the method, apparatuses, and non-transitory computer-readable medium described herein, the configured grant-specific MAC CE includes a set of indices of the recommended configuration for the recommended configured grant table including at least the index.

In some examples of the method, apparatuses, and non-transitory computer-readable medium described herein, each index of the recommended configured grant table corresponds to a configured grant configuration with a grant size per configured grant occasion, a configured grant periodicity, a type of traffic, or any combination thereof.

In some examples of the method, apparatuses, and non-transitory computer-readable medium described herein, transmitting the one or more messages indicating the recommended configuration may include operations, features, means, or instructions for transmitting an RRC message indicating the recommended configuration for the configured grant.

In some examples of the method, apparatuses, and non-transitory computer-readable medium described herein, the RRC message includes UE assistance information associated with the configured grant.

In some examples of the method, apparatuses, and non-transitory computer-readable medium described herein, receiving the configuration for the configured grant may include operations, features, means, or instructions for receiving, from the base station, an indication to activate the configured grant.

In some examples of the method, apparatuses, and non-transitory computer-readable medium described herein, receiving the configuration for the configured grant may include operations, features, means, or instructions for receiving, from the base station, an indication to modify the configured grant based on the recommended configuration for the configured grant.

Some examples of the method, apparatuses, and non-transitory computer-readable medium described herein may further include operations, features, means, or instructions for deactivating the configured grant, and reactivating the configured grant based on the recommended configuration for the configured grant.

In some examples of the method, apparatuses, and non-transitory computer-readable medium described herein, receiving the configuration for the configured grant may include operations, features, means, or instructions for receiving, from the base station, an indication to deactivate the configured grant.

In some examples of the method, apparatuses, and non-transitory computer-readable medium described herein, the recommended configuration for the configured grant includes an explicit request to deactivate the configured grant.

In some examples of the method, apparatuses, and non-transitory computer-readable medium described herein, the recommended configuration for the configured grant includes an implicit request to deactivate the configured grant based on a zero grant size, a periodicity for the configured grant, or both.

A method of wireless communications at a base station is described. The method may include receiving, from a UE, one or more messages indicating a recommended configuration for a configured grant to be transmitted to the UE, at least in part, via RRC messaging, the one or more messages including at least one of a configured grant-specific scheduling request or a configured grant-specific control element, the at least one of the configured grant-specific scheduling request or the configured grant-specific control element being formatted for association with grants that are transmitted, at least in part, via RRC messaging and transmitting, to the UE, a configuration for the configured grant based on the recommended configuration.

An apparatus for wireless communications at a base station is described. The apparatus may include a processor, memory coupled with the processor, and instructions stored in the memory. The instructions may be executable by the processor to cause the apparatus to receive, from a UE, one or more messages indicating a recommended configuration for a configured grant to be transmitted to the UE, at least in part, via RRC messaging, the one or more messages including at least one of a configured grant-specific scheduling request or a configured grant-specific control element, the at least one of the configured grant-specific scheduling request or the configured grant-specific control element being formatted for association with grants that are transmitted, at least in part, via RRC messaging and transmit, to the UE, a configuration for the configured grant based on the recommended configuration.

Another apparatus for wireless communications at a base station is described. The apparatus may include means for receiving, from a UE, one or more messages indicating a recommended configuration for a configured grant to be transmitted to the UE, at least in part, via RRC messaging, the one or more messages including at least one of a configured grant-specific scheduling request or a configured grant-specific control element, the at least one of the configured grant-specific scheduling request or the configured grant-specific control element being formatted for association with grants that are transmitted, at least in part, via RRC messaging and transmitting, to the UE, a configuration for the configured grant based on the recommended configuration.

A non-transitory computer-readable medium storing code for wireless communications at a base station is described. The code may include instructions executable by a processor to receive, from a UE, one or more messages indicating a recommended configuration for a configured grant to be transmitted to the UE, at least in part, via RRC messaging, the one or more messages including at least one of a configured grant-specific scheduling request or a configured grant-specific control element, the at least one of the configured grant-specific scheduling request or the configured grant-specific control element being formatted for association with grants that are transmitted, at least in part, via RRC messaging and transmit, to the UE, a configuration for the configured grant based on the recommended configuration.

In some examples of the method, apparatuses, and non-transitory computer-readable medium described herein, receiving the one or more messages indicating the recommended configuration may include operations, features, means, or instructions for receiving the configured grant-specific scheduling request indicating the recommended configuration for the configured grant, the configured grant-specific scheduling request being formatted for association with grants that may be transmitted, at least in part, via RRC messaging.

In some examples of the method, apparatuses, and non-transitory computer-readable medium described herein, a payload for the configured grant-specific scheduling request includes the recommended configuration for the configured grant.

Some examples of the method, apparatuses, and non-transitory computer-readable medium described herein may further include operations, features, means, or instructions for receiving a MAC CE including the recommended configuration, where the configured grant-specific scheduling request indicates the MAC CE may be associated with the configured grant.

In some examples of the method, apparatuses, and non-transitory computer-readable medium described herein, the MAC CE indicates an index of a recommended configured grant table corresponding to the recommended configuration.

In some examples of the method, apparatuses, and non-transitory computer-readable medium described herein, receiving the one or more messages indicating the recommended configuration may include operations, features, means, or instructions for receiving a configured grant-specific MAC CE indicating the recommended configuration for the configured grant, where the configured grant-specific MAC CE may be the configured grant-specific control element, and where the configured grant-specific MAC CE may be formatted for association with grants that may be transmitted, at least in part, via RRC messaging.

In some examples of the method, apparatuses, and non-transitory computer-readable medium described herein, the configured grant-specific MAC CE includes an identifier for one or more logical channel groups corresponding to the configured grant, an index corresponding to the configured grant, a recommended grant size for the configured grant, a recommended periodicity for the configured grant, or any combination thereof.

Some examples of the method, apparatuses, and non-transitory computer-readable medium described herein may further include operations, features, means, or instructions for receiving a scheduling request, where the configured grant-specific MAC CE indicates the scheduling request corresponds to the configured grant.

Some examples of the method, apparatuses, and non-transitory computer-readable medium described herein may further include operations, features, means, or instructions for identifying an index of a recommended configured grant table corresponding to the recommended configuration, where the configured grant-specific MAC CE includes the index.

In some examples of the method, apparatuses, and non-transitory computer-readable medium described herein, the configured grant-specific MAC CE includes a set of indices of the recommended configured grant table including at least the index.

In some examples of the method, apparatuses, and non-transitory computer-readable medium described herein, each index of the recommended configured grant table corresponds to a configured grant configuration with a grant size per configured grant occasion, a configured grant periodicity, a type of traffic, or any combination thereof.

In some examples of the method, apparatuses, and non-transitory computer-readable medium described herein, receiving the one or more messages indicating the recommended configuration may include operations, features, means, or instructions for receiving a RRC message indicating the recommended configuration for the configured grant.

In some examples of the method, apparatuses, and non-transitory computer-readable medium described herein, the RRC message includes UE assistance information associated with the configured grant.

In some examples of the method, apparatuses, and non-transitory computer-readable medium described herein, transmitting the configuration for the configured grant may include operations, features, means, or instructions for transmitting, to the UE, an indication to activate the configured grant.

In some examples of the method, apparatuses, and non-transitory computer-readable medium described herein, transmitting the configuration for the configured grant may include operations, features, means, or instructions for transmitting, to the UE, an indication to modify the configured grant based on the recommended configuration for the configured grant.

Some examples of the method, apparatuses, and non-transitory computer-readable medium described herein may further include operations, features, means, or instructions for deactivating the configured grant based on the indication to modify the configured grant, and reactivating the configured grant based on the recommended configuration for the configured grant.

In some examples of the method, apparatuses, and non-transitory computer-readable medium described herein, transmitting the configuration for the configured grant may include operations, features, means, or instructions for transmitting, to the UE, an indication to deactivate the configured grant.

In some examples of the method, apparatuses, and non-transitory computer-readable medium described herein, the recommended configuration for the configured grant includes an explicit request to deactivate the configured grant.

In some examples of the method, apparatuses, and non-transitory computer-readable medium described herein, the recommended configuration for the configured grant includes an implicit request to deactivate the configured grant based on a zero grant size, a periodicity for the configured grant, or both.

DETAILED DESCRIPTION

Figure 1:
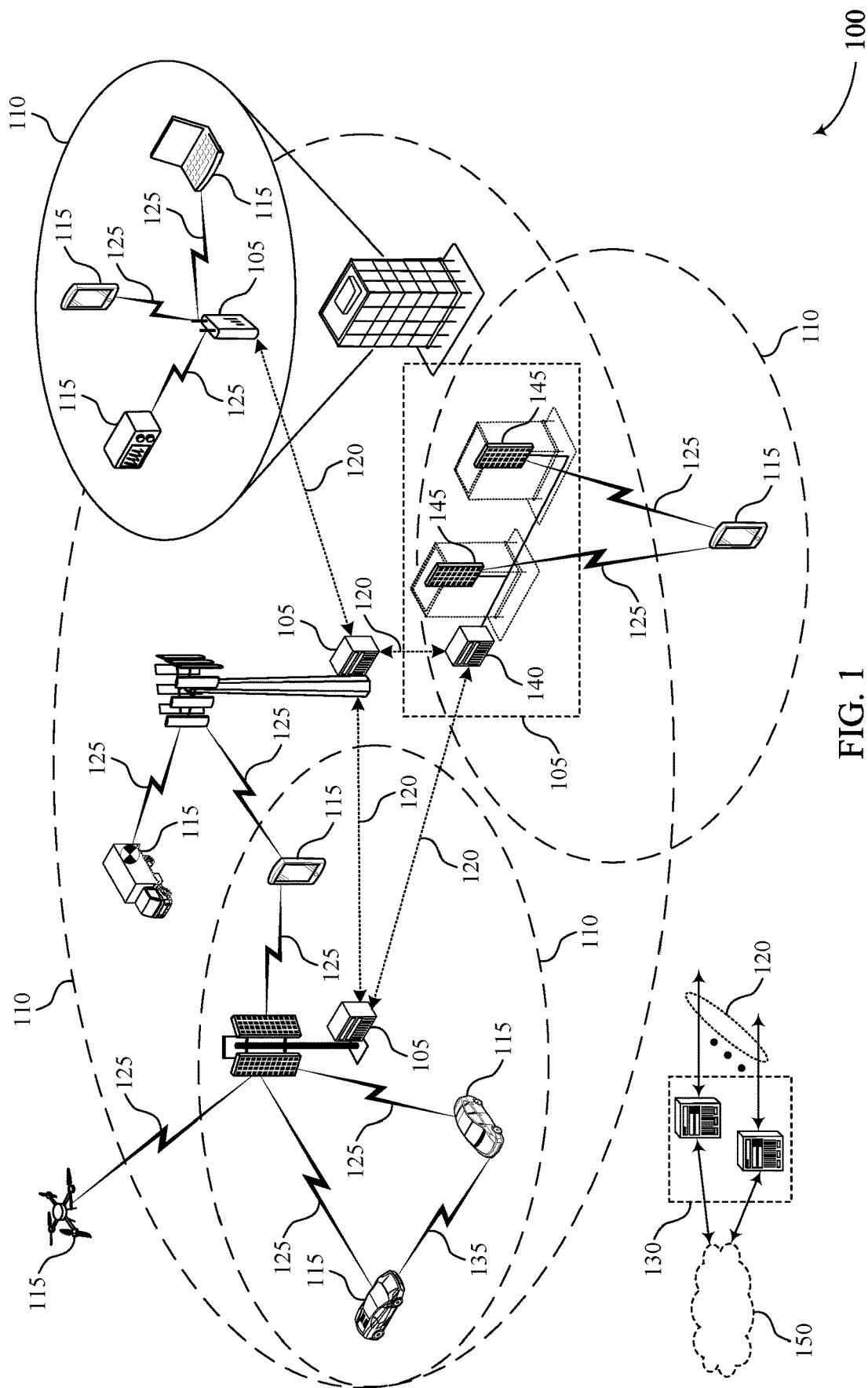
FIG. 1 illustrates an example of a system for wireless communications that supports a configured grant scheduling request in accordance with aspects of the present disclosure.

Some wireless communications system support periodically or semi-periodically scheduled resources for efficient uplink and downlink communications. For example, extended reality (XR) and augmented reality (AR) systems may use periodically or semi-periodically scheduled resources. Utilizing periodic or semi-periodic resources may reduce control signaling overhead to schedule and coordinate wireless communications.

For example, a user equipment (UE) may be configured with periodic downlink resources to monitor for transmissions from a base station. Uplink communications may use a configured grant, where a UE is configured with periodic uplink resources to transmit to a base station. In some systems, the network may determine a configuration and resource assignment for a configured grant. For example, a base station, or another network entity, may determine a periodicity, a time offset, and acknowledgment feedback configurations, among other parameters, for a configured grant. However, the network may not have sufficient or accurate information of the uplink traffic to configure an efficient configured grant. In some cases, some configurations or assignments of a configured grant as determined by the network may not be well-aligned with the actual uplink traffic characteristics at a UE. For example, the UE may interrupt communications on resources for the configured grant in order to send other signaling, or the UE may not efficiently use all of the resources of the configured grant if the configured grant provides excessive resources. Thus, a configured grant in some systems may waste resources. Additionally, in some cases, uplink traffic characteristics may change over time. Therefore, a configured grant which may have been efficient before may become inefficient over time as uplink traffic characteristics change.

Techniques described herein support an efficient configured grant scheme. A UE may indicate a recommended configuration for a configured grant or indicate uplink channel characteristics, such that a configured grant for the UE can be more efficient given the uplink channel characteristics at the UE. In some cases, the UE may send a configured grant-specific message to the base station to indicate the recommended configuration based on uplink traffic characteristics, and the base station may determine, update, or deactivate, a configured grant for the UE based on the indication. In some cases, UE may send a configured grant-specific scheduling request to the base station. Additionally, or alternatively, the UE may send a configured grant-specific control element to the base station. In some cases, the control element may indicate an entry of a table with multiple configured grants configurations, and the UE may select one or more recommended configurations from the table. Additionally, or alternatively, the UE may send a configured grant-specific Radio Resource Control (RRC)

message or configured grant-specific control element (e.g., a configured grant-specific Medium Access Control (MAC) control element (CE)) to indicate the recommended configuration.

The base station may receive the indication and activate, deactivate, or modify a configured grant in response. In some cases, the base station may activate the configured grant if the configured grant is not active. In some cases, the base station may modify parameters for an active configured grant based on receiving the indication of the recommended configuration. In some examples, the base station may deactivate a configured grant and reactivate the configured grant based on a recommended configuration. In some cases, the UE may request to deactivate a configured grant, and the base station may deactivate the configured grant. By implementing these techniques, the UE may be configured with a more efficient configured grant which may align closer to the actual uplink traffic characteristics at the UE.

Aspects of the disclosure are initially described in the context of wireless communications systems. Aspects of the disclosure are further illustrated by and described with reference to apparatus diagrams, system diagrams, and flowcharts that relate to a configured grant scheduling request.

FIG. 1 illustrates an example of a wireless communications system 100 that supports a configured grant scheduling request in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

The wireless communications system 100 may support periodically or semi-periodically scheduled resources for efficient uplink and downlink communications. For example, a UE 115 may be configured with periodic downlink resources to monitor for transmissions from a base station 105. Uplink communications may use a configured grant, where a UE 115 is configured with periodic uplink resources to transmit to a base station 105.

In some systems, the network may determine a configuration and resource assignment for a configured grant. For example, a base station 105, or another network entity, may determine a periodicity, a time offset, and acknowledgment feedback configurations, among other parameters, for a configured grant. However, the network may not have sufficient or accurate information of the uplink traffic to configure an efficient configured grant. In some cases, some configurations or assignments of a configured grant as determined by the network may not be well-aligned with the actual uplink traffic characteristics at a UE 115. For example, the UE 115 may interrupt communications on resources for the configured grant in order to send other signaling, or the UE 115 may not efficiently use all of the resources of the configured grant if the configured grant provides excessive resources. Thus, a configured grant in some systems may waste resources. Additionally, in some cases, uplink traffic characteristics may change over time. Therefore, a configured grant which may have been efficient before may become inefficient over time as uplink traffic characteristics change.

For example, SPS and configured grant communications may be implemented for some systems implementing augmented reality (AR) or extended reality (XR), or both. XR traffic may have low latency requirements while supporting a dynamic frame rate and a variable in packet size. Some systems may utilize multiple separate configured grants, each with different configuration parameters, to meet these requirements. For example, a UE 115 may be configured with a first configured grant with a small packet size with a small periodicity and a second configured grant with a large packet size and larger periodicity, which may support dynamic variation of traffic using the two different configurations. However, using multiple configured grants may use significant resources and may reduce efficient resource utilization. Additionally, there may be significant delays if the network were to measure traffic, determine a new configuration, then reconfigure, activate, or deactivate the different configured grants in response to traffic pattern variations.

Techniques described herein support an efficient configured grant scheme. A UE 115 may indicate a recommended configuration for a configured grant or indicate uplink channel characteristics, such that a configured grant for the UE 115 can be more efficient given the uplink channel characteristics at the UE 115. For example, the UE 115 may trigger activation, deactivation, or reconfiguration for a configured grant, which may provide a configured grant which reflects the current traffic patterns at the UE 115. These techniques may provide fast activation, deactivation, and reconfiguration for a configured grant, which may be implemented at least to meet the low latency requirements of systems implementing XR signaling. In some cases, the UE 115 may send a configured grant-specific message to the base station 105 to indicate the recommended configuration based on uplink traffic characteristics, and the base station 105 may determine, activate, update, or deactivate, a configured grant for the UE 115 based on the indication. In some cases, UE 115 may send a configured grant-specific scheduling request to the base station 105. Additionally, or alternatively, the UE 115 may send a configured grant-specific control element to the base station 105. A configured grant-specific MAC CE may be one example of a configured grant-specific control element. In some cases, the control element may indicate an entry of a table with multiple configured grants configurations, and the UE 115 may select one or more recommended configurations from the table. Additionally, or alternatively, the UE 115 may send a configured grant-specific RRC message to indicate the recommended configuration.

The base station 105 may receive the indication and activate, deactivate, or modify a configured grant in response. In some cases, the base station 105 may activate the configured grant if the configured grant is not active. In some cases, the base station 105 may modify parameters for an active configured grant based on receiving the indication of the recommended configuration. In some examples, the base station 105 may deactivate a configured grant and reactivate the configured grant based on a recommended configuration. In some cases, the UE 115 may request to deactivate a configured grant, and the base station 105 may deactivate the configured grant. By implementing these techniques, the UE 115 may be configured with a more efficient configured grant which may align closer to the actual uplink traffic characteristics at the UE 115.

Figure 2:
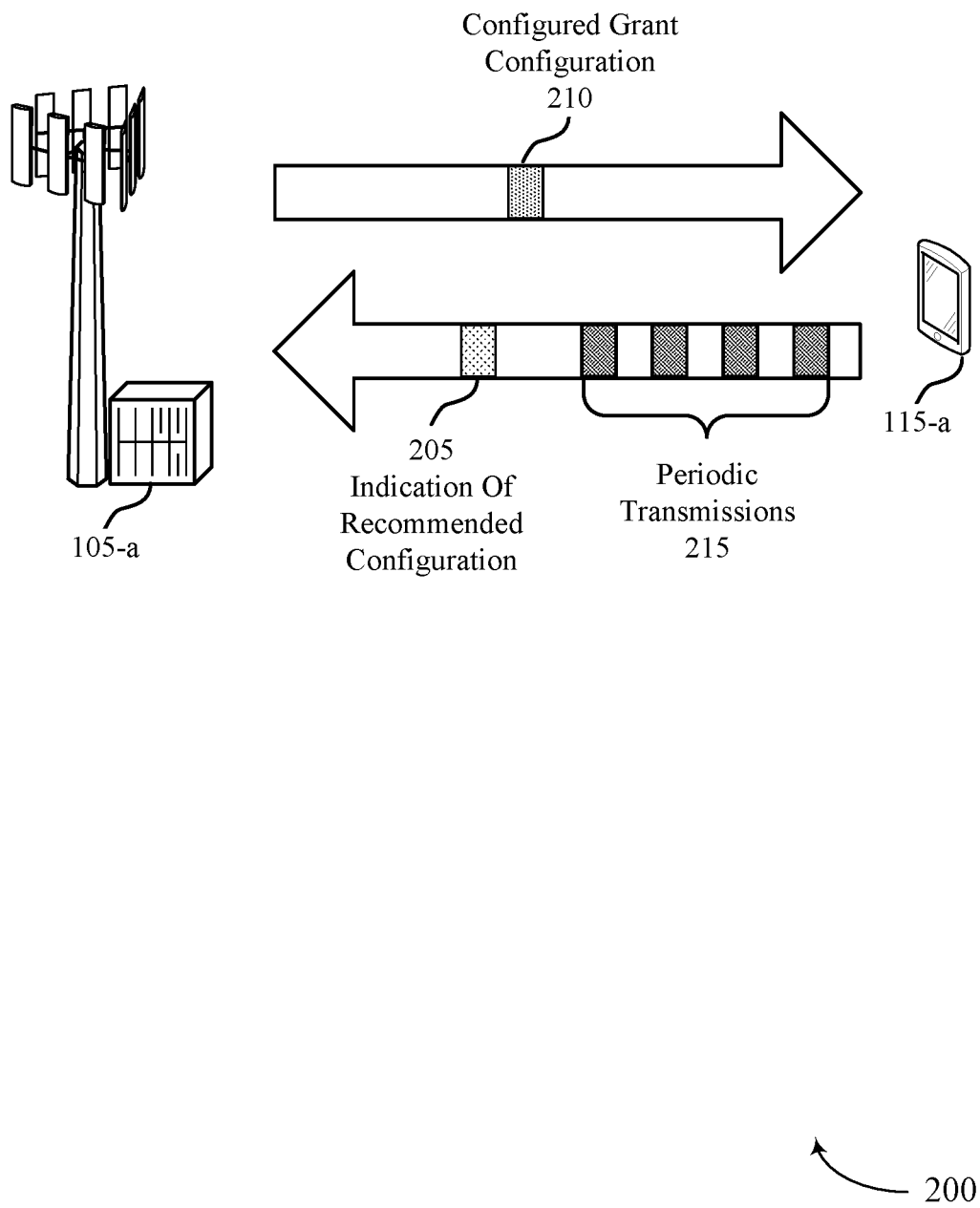
FIG. 2 illustrates an example of a wireless communications system that supports a configured grant scheduling request in accordance with aspects of the present disclosure.

FIG. 2 illustrates an example of a wireless communications system 200 that supports a configured grant scheduling request in accordance with aspects of the present disclosure. In some examples, the wireless communications system 200 may implement aspects of wireless communication system 100. The wireless communications system 200 may include UE 115-*a* and base station 105-*a*, which may be respective examples of a UE 115 and a base station 105 described herein.

The wireless communications system 200 may support periodically or semi-periodically scheduled resources for efficient uplink and downlink communications. Utilizing periodic or semi-periodic resources may reduce control signaling overhead to schedule and coordinate wireless communications. For example, some types of applications or traffics may have periodic signaling and may be suitable for periodically or semi-periodically scheduled resources, such as Voice over IP, AR applications, or XR applications, any number of which may be implemented by the wireless communications system 200. Downlink communications may use semi-periodic scheduling (SPS).

For example, UE 115-*a* may be configured with periodic downlink resources in an SPS configuration to monitor for transmissions from base station 105-*a*. Uplink communications may use a configured grant, where UE 115-*a* is configured with periodic uplink resources to transmit periodic transmission 215 to base station 105-*a* on the periodic uplink resources.

There may be multiple different types or configurations for a configured grant. In a first example, an uplink grant may be provided by RRC and stored at UE 115-a. In a second example, an uplink grant may be provided via a downlink control channel, and UE 115-a may store or clear the uplink grant based on Layer 1 signaling of activation or deactivation.

In some cases, a network may determine a configuration and resource assignment for a configured grant. For example, base station 105-a may determine a periodicity, a time offset, a number of HARQ processes, etc. In some cases, base station 105-a may configure these parameters at UE 115-a over RRC signaling for a first type of configured grant. For a second type of configured grant, a time and frequency resource allocation, repetition type, etc. may be indicated by a downlink control channel for configured grant activation.

In some cases, the network may not have sufficient or accurate information of the uplink traffic to configure an efficient configured grant. Therefore, some configurations or assignments of a configured grant as determined by the network may not be well-aligned with actual uplink traffic characteristics at a UE 115. For example, the UE 115 may interrupt communications on resources for the configured grant in order to send other signaling, or the UE 115 may not efficiently use all of the resources of the configured grant if the configured grant provides excessive resources for the amount of signaling the UE 115 has to send. Thus, the network (e.g., a base station 105) may not have enough information for the traffic to determine an efficient amount of resources for the configured grant. Additionally, in some cases, uplink traffic characteristics may change over time. Therefore, a configured grant which may have been efficient before may become inefficient over time as uplink traffic characteristics change.

The wireless communications system 200 may support techniques for determining an efficient uplink configured grant based on traffic information from a UE 115. For example, UE 115-a may send an indication 205 of a recommended configuration to base station 105-a. For example, UE 115-a may send a configured grant-specific message to base station 105-a to indicate the recommended configuration based on uplink traffic characteristics, and base station 105-a may determine, update, or deactivate, a configured grant for UE 115-a based on the indication 205.

In some cases, UE 115-a may send a configured grant-specific scheduling request to base station 105-a. At least one uplink resource for a scheduling request may be assigned, or associated with, a configured grant or a set of configured grants. For example, a configured grant-specific scheduling request may be associated with one or more configured grant configurations. To request activation of a configured grant (e.g., which is not currently active), UE 115-a may trigger a transmission using a scheduling request configuration associated with that configured grant. Similarly, UE 115-a may request modification of a configured grant which is currently active. UE 115-a may trigger transmission using an associated scheduling request configuration to indicate the request to modify the active configured grant. The configured grant-specific scheduling request may be transmitted on an uplink control channel, a random access channel, or both.

In some examples, a scheduling request may be associated with multiple configured grant configurations. For example, a common configured grant-specific scheduling request may be used for multiple (e.g., all established for UE 115-a) configured grant configurations. In some cases, UE 115-a may send some additional information (e.g., in the contents of a scheduling request, or in a MAC CE), which may refine or further specify information for a common configured grant-specific scheduling request.

In some cases, the resource associated with the configured grant-specific scheduling request may be on a separate resource from other scheduling requests (e.g., used for dynamic grants) or a separate resource from other uplink control channel resources. For example, if UE 115-a uses a specific resource to transmit a scheduling request, the scheduling request may be associated with one or more configured grants based on being transmitted on the specific resource.

In some cases, a configured grant-specific scheduling request may have a different payload, sequence, or cyclic shift than scheduling requests for dynamic grants. For example, UE 115-a may include information in an uplink control information payload of a scheduling request to indicate that the scheduling request is a configured grant-specific scheduling request. Additionally, or alternatively, certain sequences or cyclic shifts may be associated with (e.g., reserved for) configured grant-specific scheduling requests. In some these examples, a configured grant-specific scheduling request may use a same format or resource as scheduling requests for dynamic grants, but configured grant-specific scheduling request may have different, configured grant-specific contents.

In some cases, UE 115-a may transmit a configured grant-specific control element, such as a configured grant-specific MAC CE. The configured grant-specific MAC CE may have a logical channel identifier which is specific to the configured grant-specific MAC CE. In some cases, the configured grant-specific MAC CE may be transmitted with a scheduling request to deliver a detailed configuration for a configured grant as recommended by UE 115-a. In some cases, UE 115-a may transmit both a configured grant-specific scheduling request and a configured grant-specific MAC CE.

The configured grant-specific MAC CE may include detailed information for a recommended configuration for a configured grant. For example, the configured grant-specific MAC CE may include fields for one or more logical channel group identifiers, one or more indices of configured grant configurations (e.g., there may be multiple configured grant configurations), a recommended grant size per configured grant occasion, a recommended configured grant periodicity, or any combination thereof. Therefore, UE 115-a may indicate a specific configuration for a configured grant which may be efficient for the current uplink traffic characteristics.

In some cases, the wireless communications system 200 may support a table with multiple possible configured grant configurations. Each entry of the table may include a information for a possible configured grant configuration. For example, each entry of the table may include a recommended grant size per configured grant occasion, a recommended configured grant periodicity, a type of traffic, etc. In some cases, a configured grant-specific MAC CE may refer to one or more indexes of the table to indicate a recommended configured grant configuration. Base station 105-a may receive a MAC CE indicating one or more indexes of the table, identify the recommended configurations at corresponding indexes of the table, and select a configuration for a configured grant from the recommended configurations. In some cases, the MAC CE may indicate one or more recommended configured grant configurations. In some cases, the table may be stored in memory at base station 105-a and UE 115-a. The table may be preconfigured, or the table may be configured or updated semi-statically (e.g., via RRC messages).

In some examples, UE 115-*a* may send a configured grant-specific RRC message. For example, the configured grant-specific RRC message may include UE assistance information for a configured grant. The RRC message may include information for a recommended configuration for the configured grant.

UE 115-*a* may send any one or more of a scheduling request, a MAC CE, and an RRC message in the indication 205 to indicate a recommended configuration for a configured grant. For example, UE 115-*a* may send just a configured grant-specific scheduling request to indicate, or request, a recommended configuration for a configured grant. UE 115-*a* may indicate a recommended configuration via the scheduling request, the MAC CE, the RRC message, or any combination thereof. For example, in some cases UE 115-*a* may include an indication of the recommended configuration in the scheduling request. Similarly, UE 115-*a* may include the indication of the recommended configuration in the MAC CE, the RRC message, or both.

In some cases, UE 115-*a* may send a configured grant-specific scheduling request and a MAC CE (e.g., not a configured grant-specific MAC CE). The configured grant-specific scheduling request may indicate that the MAC CE carries information for the configured grant. In some cases, the MAC CE may include information for a configured grant recommendation table, such as an index of a recommended configuration for the configured grant. In some cases, UE 115-*a* may utilize a buffer status report (BSR) MAC CE to indicate a recommended configuration for the configuration. For example, UE 115-*a* may select an index from the buffer status report field, indicate the selected index with the MAC CE, and use the configured grant-specific scheduling request to indicate that the MAC CE is used for configured grant, and that the index indicated by the MAC CE corresponds to an index of a configured grant configuration table. In some cases, a field in the MAC CE, such as a buffer size field for a BSR MAC CE, may be used to indicate an index in the configured grant recommendation table.

In some examples, UE 115-*a* may transmit a scheduling request (e.g., not a configured grant-specific scheduling request) and a configured grant-specific MAC CE. In this example, the configured grant-specific MAC CE may include information to indicate that the scheduling request corresponds to, or is intended for, a configured grant. For example, the scheduling request may be applicable for either configured grant or a dynamic grant, and the configured grant-specific MAC CE may indicate that the scheduling request is used for configured grant.

In some cases, UE 115-*a* may transmit a configured grant-specific scheduling request and a configured grant-specific MAC CE. For example, both the scheduling request and the MAC CE may be configured for configured grant, specifically.

Base station 105-*a* may receive the indication 205 and activate, deactivate, or modify a configured grant in response. For example, base station 105-*a* may transmit a configuration 210 for a configured grant to UE 115-*a* in response to the indication 205. In some cases, base station 105-*a* may activate the configured grant if the configured grant is not active. For example, UE 115-*a* may transmit the indication 205 to indicate a certain configured grant, and base station 105-*a* may receive the indication 205 and activate the configured grant in response.

In some cases, base station 105-*a* may modify parameters for an active configured grant based on receiving the indication 205 of the recommended configuration. For example, base station 105-*a* may modify a periodicity, a grant size, HARQ resources, etc. Some parameters for a configured grant may be re-configured via RRC. For example, base station 105-*a* may update a periodicity for a configured grant and transmit the new configuration via an RRC message to UE 115-*a*. In some examples, base station 105-*a* may deactivate a configured grant and reactivate the configured grant based on a recommended configuration. For example, base station 105-*a* may reactivate the configured grant with a new set of parameters, which may be based on a recommended configuration included in the indication 205.

In some cases, UE 115-*a* may include an identifier of a configured grant which UE 115-*a* is requesting to deactivate, and base station 105-*a* may deactivate the configured grant based on receiving the indication 205. UE 115-*a* may implicitly or explicitly request to deactivate a configured grant. For example, the indication 205 may include an explicit request to deactivate a configured grant. For an implicit request to deactivate a configured grant, UE 115-*a* may indicate a grant size of zero or an infinite periodicity for a configured grant.

By implementing these techniques, UE 115-*a* may be configured with a more efficient configured grant. For example, UE 115-*a* may transmit the indication 205 based on detected uplink traffic characteristics to recommend a more efficient configuration for the configured grant, and base station 105-*a* may modify, activate, or deactivate a configured grant accordingly.

Figure 3:
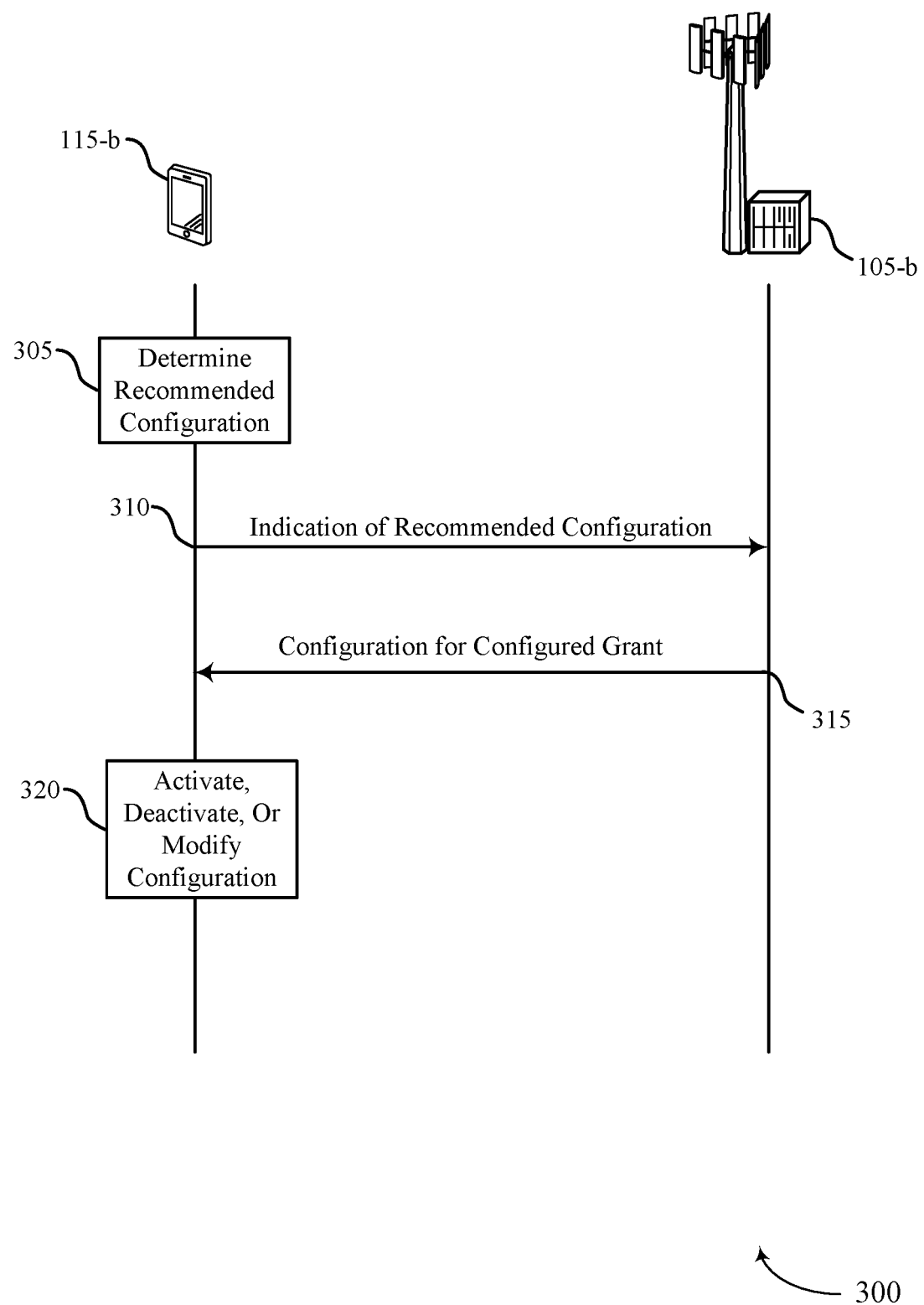
FIG. 3 illustrates an example of a process flow that supports a configured grant scheduling request in accordance with aspects of the present disclosure.

FIG. 3 illustrates an example of a process flow 300 that supports a configured grant scheduling request in accordance with aspects of the present disclosure. In some examples, the process flow 300 may implement aspects of wireless communication system 100. The process flow 300 may be implemented by UE 115-*b*, base station 105-*b*, or both. UE 115-*b* and base station 105-*b* may be examples of a UE 115 and a base station 105 as described with reference to FIGS. 1 and 2

At 305, UE 115-*b* may determine a recommended configuration for a configured grant that is to be received, at least in part, via radio resource control messaging. In some cases, UE 115-*b* may determine whether to request to activate a currently inactive configured grant configuration, whether to request to deactivate a currently active configured grant configuration, or whether to modify a configured grant configuration.

At 310, UE 115-*b* may transmit, to base station 105-*b*, one or more messages indicating the recommended configuration for the configured grant at UE 115-*b*, the one or more messages including at least one of a configured grant-specific scheduling request or a configured grant-specific control element, at least one of the configured grant-specific scheduling request or the configured grant-specific control element being formatted for association with grants that are received, at least in partially, via radio resource control messaging.

In some cases, UE 115-*b* may transmit the configured grant-specific scheduling request indicating the recommended configuration for the configured grant. Additionally, or alternatively, UE 115-*b* may transmit a configured grant-specific MAC CE indicating the recommended configuration for the configured grant. Additionally, or alternatively, UE 115-*b* may transmit an RRC message indicating the recommended configuration for the configured grant. UE 115-*b* may transmit any one or more of a scheduling request, a MAC CE, and an RRC message to indicate the recommended configuration. In some cases, any one or more of the scheduling request, the MAC CE, and the RRC message may be specifically associated with a configured grant.

At 315, base station 105-*b* may transmit, to UE 115-*b*, a configuration for the configured grant based on the recommended configuration. In some cases, at 320, UE 115-*b* may activate, deactivate, or modify a configured grant configuration based on receiving the configuration at 315. For example, UE 115-*b* may receive an indication to activate the configured grant. In some examples, UE 115-*b* may receive an indication to deactivate the configured grant and to reactivate the configured grant based on the recommended configuration. In some cases, UE 115-*b* may receive an indication to modify the configured grant based on the recommended configuration. In some cases, UE 115-*b* may receive an indication to deactivate the configured grant. UE 115-*b* may then communicate (e.g., if the configured grant is active) using the configured grant according to the configuration received at 315.

Figure 4:
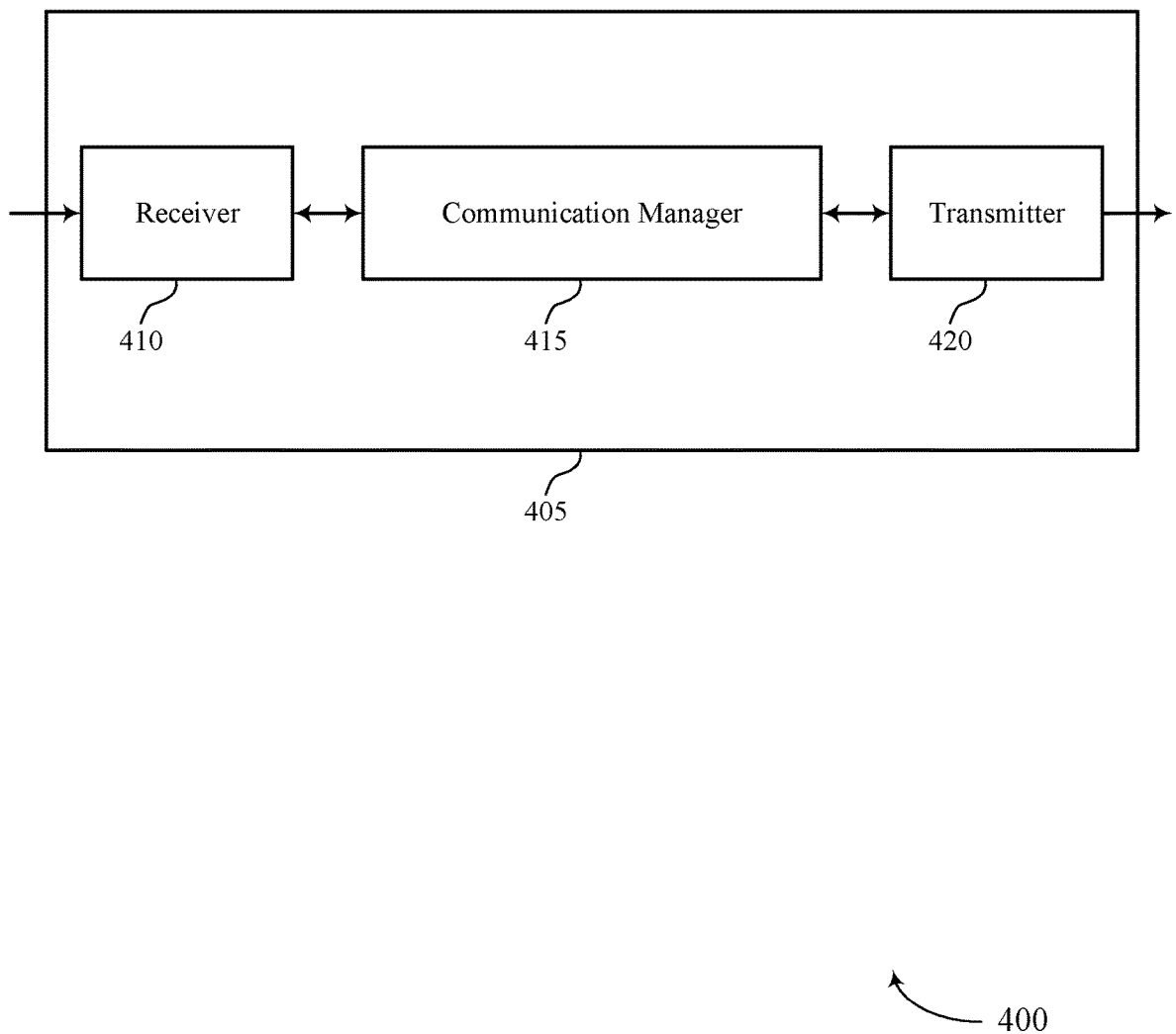
FIGS. 4 and 5 show block diagrams of devices that support a configured grant scheduling request in accordance with aspects of the present disclosure.

FIG. 4 shows a block diagram 400 of a device 405 that supports a configured grant scheduling request in accordance with aspects of the present disclosure. The device 405 may be an example of aspects of a UE 115 as described herein. The device 405 may include a receiver 410, a communication manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to a configured grant scheduling request, etc.). Information may be passed on to other components of the device 405. The receiver 410 may be an example of aspects of the transceiver 715 described with reference to FIG. 7. The receiver 410 may utilize a single antenna or a set of antennas.

The communication manager 415 may determine, at the UE, a recommended configuration for a configured grant that is to be received, at least in part, via radio resource control messaging, transmit, to a base station, one or more messages indicating the recommended configuration for the configured grant at the UE, the one or more messages including at least one of a configured grant-specific scheduling request or a configured grant-specific control element, at least one of the configured grant-specific scheduling request or the configured grant-specific control element being formatted for association with grants that are received, at least in part, via radio resource control messaging, and receive, from the base station, a configuration for the configured grant based on the recommended configuration. The communication manager 415 may be an example of aspects of the communication manager 710 described herein.

The communication manager 415, or its sub-components, may be implemented in hardware, code (e.g., software or firmware) executed by a processor, or any combination thereof. If implemented in code executed by a processor, the functions of the communication manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 415, or its sub-components, may be physically located at various positions, including being distributed such that portions of functions are implemented at different physical locations by one or more physical components. In some examples, the communication manager 415, or its sub-components, may be a separate and distinct component in accordance with various aspects of the present disclosure. In some examples, the communication manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the UE communications manager 415 as described herein may be implemented to realize one or more potential advantages. One implementation may allow a UE 115 to improve resource utility efficiency by requesting a configured grant with a resource allocation that is based on actual uplink traffic characteristics. This way, the UE 115 may be allocated an amount of resources which is closer to the amount that the UE 115 needs. This may improve efficiency if, for example, the UE 115 was wasting resources with a previous configured grant configuration which provided excessive resources. Additionally, the resource allocations for the configured grant may have a periodicity which may be more efficient for the UE 115. For example, the UE 115 may request for the resources of the configured grant to be allocated based on other signaling configured for the UE 115.

The transmitter 420 may transmit signals generated by other components of the device 405. In some examples, the transmitter 420 may be collocated with a receiver 410 in a transceiver module. For example, the transmitter 420 may be an example of aspects of the transceiver 715 described with reference to FIG. 7. The transmitter 420 may utilize a single antenna or a set of antennas.

Figure 5:
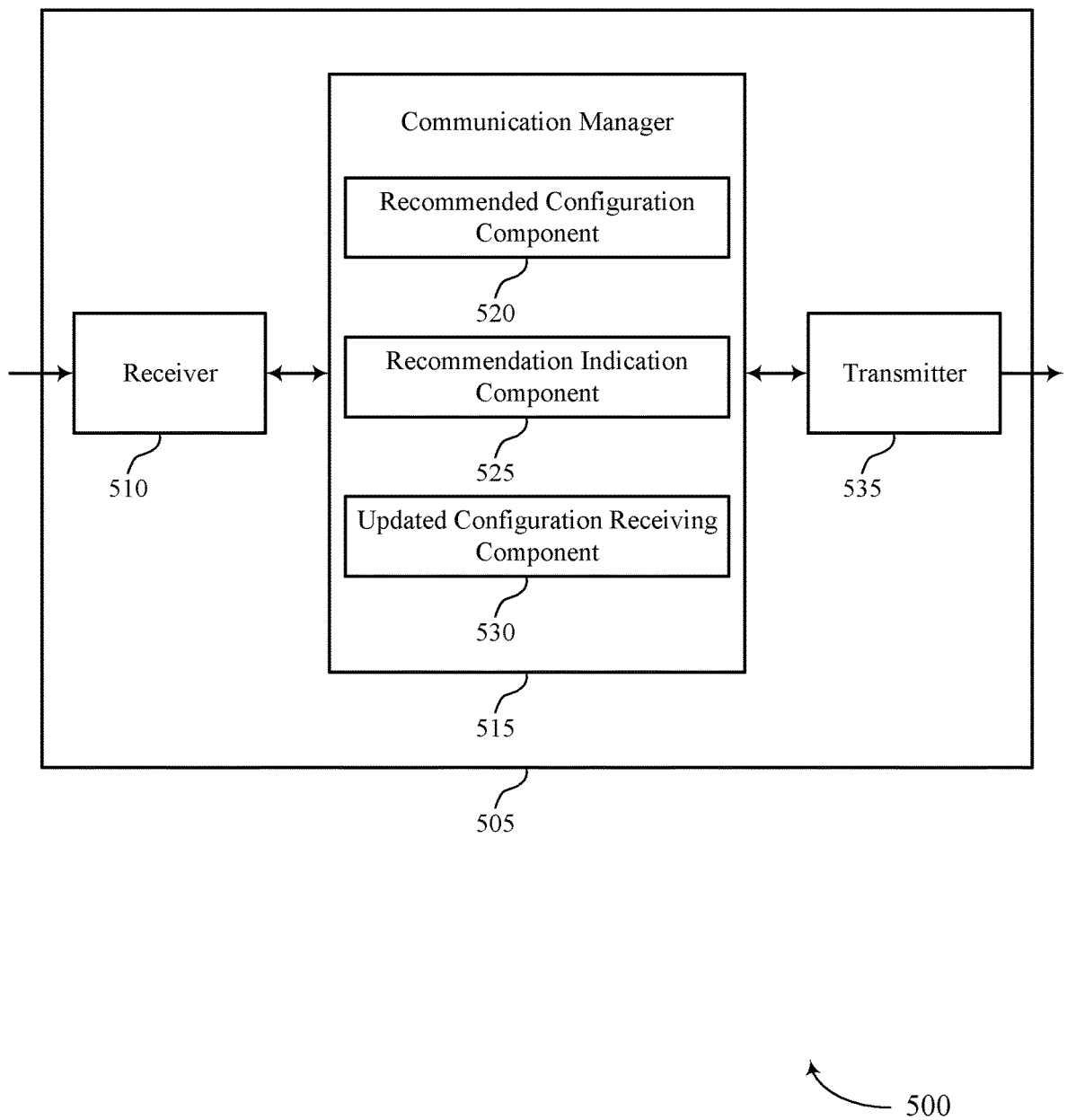

FIG. 5 shows a block diagram 500 of a device 505 that supports a configured grant scheduling request in accordance with aspects of the present disclosure. The device 505 may be an example of aspects of a device 405, or a UE 115 as described herein. The device 505 may include a receiver 510, a communication manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to a configured grant scheduling request, etc.). Information may be passed on to other components of the device 505. The receiver 510 may be an example of aspects of the transceiver 715 described with reference to FIG. 7. The receiver 510 may utilize a single antenna or a set of antennas.

The communication manager 515 may be an example of aspects of the communication manager 415 as described herein. The communication manager 515 may include a recommended configuration component 520, a recommendation indication component 525, and an updated configuration receiving component 530. The communication manager 515 may be an example of aspects of the communication manager 710 described herein.

The recommended configuration component 520 may determine, at the UE, a recommended configuration for a configured grant that is to be received, at least in part, via radio resource control messaging.

The recommendation indication component 525 may transmit, to a base station, one or more messages indicating the recommended configuration for the configured grant at the UE, the one or more messages including at least one of a configured grant-specific scheduling request or a configured grant-specific control element, at least one of the configured grant-specific scheduling request or the configured grant-specific control element being formatted for association with grants that are received, at least in part, via radio resource control messaging.

The updated configuration receiving component 530 may receive, from the base station, a configuration for the configured grant based on the recommended configuration.

The transmitter 535 may transmit signals generated by other components of the device 505. In some examples, the transmitter 535 may be collocated with a receiver 510 in a transceiver module. For example, the transmitter 535 may be an example of aspects of the transceiver 715 described with reference to FIG. 7. The transmitter 535 may utilize a single antenna or a set of antennas.

Figure 6:
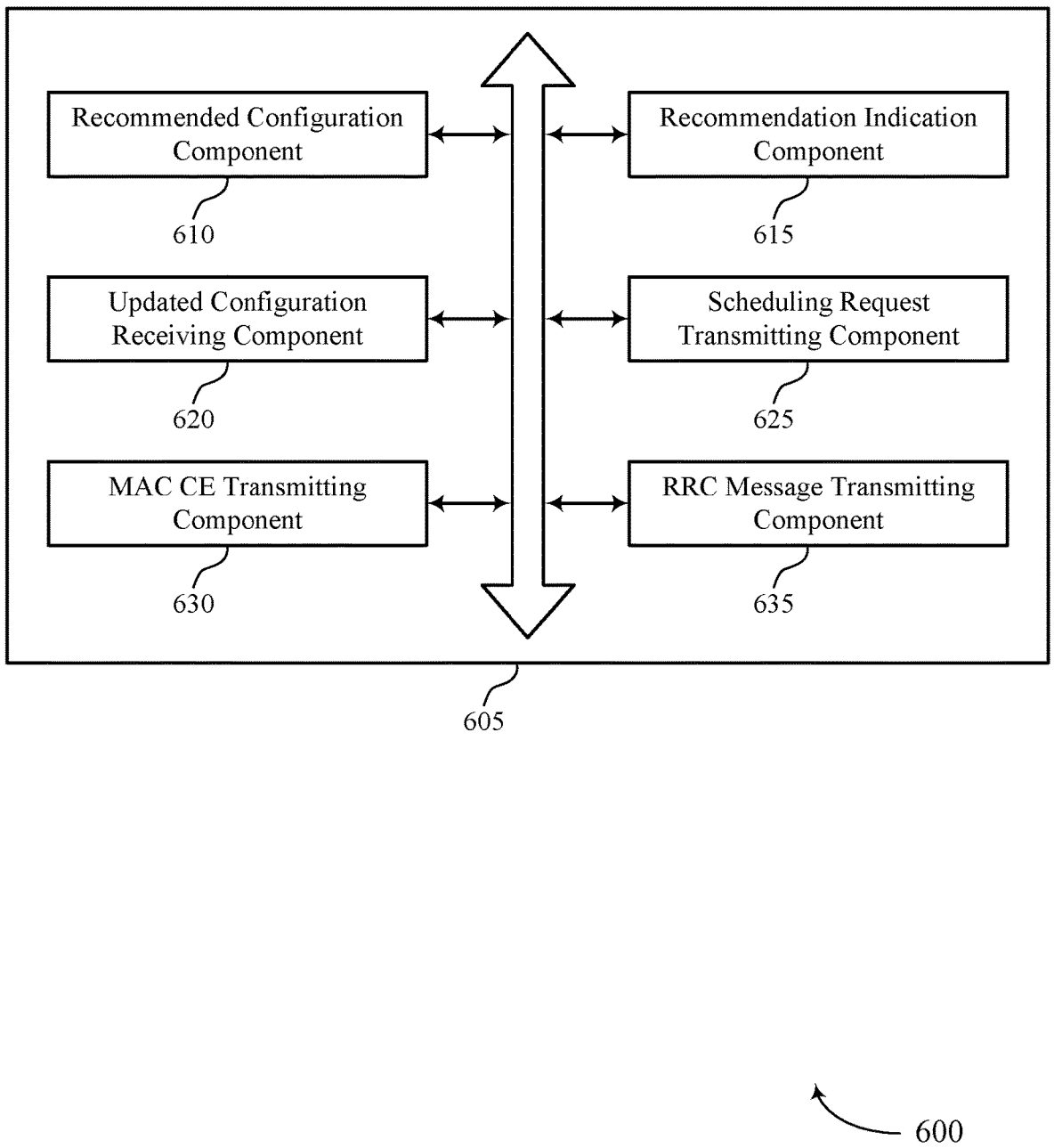
FIG. 6 shows a block diagram of a communication manager that supports a configured grant scheduling request in accordance with aspects of the present disclosure.

FIG. 6 shows a block diagram 600 of a communication manager 605 that supports a configured grant scheduling request in accordance with aspects of the present disclosure. The communication manager 605 may be an example of aspects of a communication manager 415, a communication manager 515, or a communication manager 710 described herein. The communication manager 605 may include a recommended configuration component 610, a recommendation indication component 615, an updated configuration receiving component 620, a scheduling request transmitting component 625, a MAC CE transmitting component 630, and a RRC message transmitting component 635. Each of these modules may communicate, directly or indirectly, with one another (e.g., via one or more buses).

The recommended configuration component 610 may determine, at the UE, a recommended configuration for a configured grant that is to be received, at least in part, via radio resource control messaging. The recommendation indication component 615 may transmit, to a base station, one or more messages indicating the recommended configuration for the configured grant at the UE, the one or more messages including at least one of a configured grant-specific scheduling request or a configured grant-specific control element, at least one of the configured grant-specific scheduling request or the configured grant-specific control element being formatted for association with grants that are received, at least in part, via radio resource control messaging.

The updated configuration receiving component 620 may receive, from the base station, a configuration for the configured grant based on the recommended configuration. In some examples, the updated configuration receiving component 620 may receive, from the base station, an indication to activate the configured grant. In some examples, the updated configuration receiving component 620 may receive, from the base station, an indication to modify the configured grant based on the recommended configuration for the configured grant. In some examples, the updated configuration receiving component 620 may deactivate the configured grant.

In some examples, the updated configuration receiving component 620 may reactivate the configured grant based on the recommended configuration for the configured grant. In some examples, the updated configuration receiving component 620 may receive, from the base station, an indication to deactivate the configured grant. In some cases, the recommended configuration for the configured grant includes an explicit request to deactivate the configured grant. In some cases, the recommended configuration for the configured grant includes an implicit request to deactivate the configured grant based on a zero grant size, a periodicity for the configured grant, or both.

The scheduling request transmitting component 625 may transmit the configured grant-specific scheduling request indicating the recommended configuration for the configured grant, the configured grant-specific scheduling request being formatted for association with grants that are received, at least in part, via radio resource control messaging.

In some examples, the scheduling request transmitting component 625 may transmit a MAC CE including the recommended configuration, where the configured grant-specific scheduling request indicates the MAC CE is associated with the configured grant. In some cases, a payload for the configured grant-specific scheduling request includes the recommended configuration for the configured grant. In some cases, the MAC CE indicates an index of a recommended configured grant table corresponding to the recommended configuration. In some cases, the configured grant-specific scheduling request is transmitted on an uplink control channel, a random access channel, or both.

The MAC CE transmitting component 630 may transmit a configured grant-specific MAC CE indicating the recommended configuration for the configured grant, where the configured grant-specific MAC CE is the configured grant-specific control element, and the configured grant-specific MAC CE is formatted for association with grants that are received, at least in part, via radio resource control messaging.

In some examples, the MAC CE transmitting component 630 may transmit a scheduling request, where the configured grant-specific MAC CE indicates that the scheduling request corresponds to the configured grant. In some examples, the MAC CE transmitting component 630 may determine an index of a recommended configured grant table corresponding to the recommended configuration, where the configured grant-specific MAC CE includes the index. In some cases, the configured grant-specific MAC CE includes an identifier for one or more logical channel groups corresponding to the configured grant, an index corresponding to the configured grant, a recommended grant size for the configured grant, a recommended periodicity for the configured grant, or any combination thereof.

In some cases, the configured grant-specific MAC CE includes a set of indices of the recommended configuration for the recommended configured grant table including at least the index. In some cases, each index of the recommended configured grant table corresponds to a configured grant configuration with a grant size per configured grant occasion, a configured grant periodicity, a type of traffic, or any combination thereof.

The RRC message transmitting component 635 may transmit a radio resource control message indicating the recommended configuration for the configured grant. In some cases, the radio resource control message includes UE assistance information associated with the configured grant.

Figure 7:
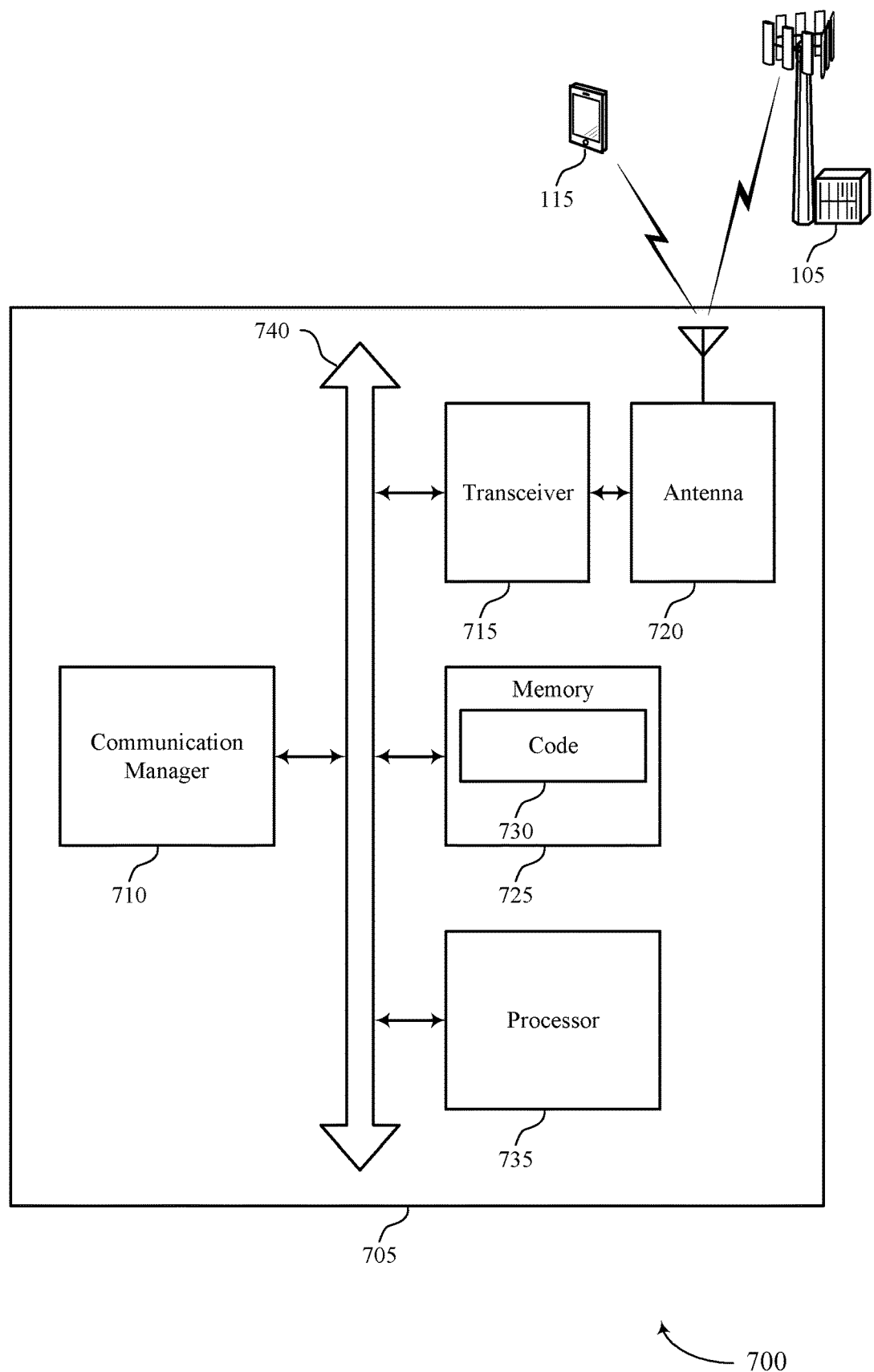
FIG. 7 shows a diagram of a system including a device that supports a configured grant scheduling request in accordance with aspects of the present disclosure.

FIG. 7 shows a diagram of a system 700 including a device 705 that supports a configured grant scheduling request in accordance with aspects of the present disclosure. The device 705 may be an example of or include the components of device 405, device 505, or a UE 115 as described herein. The device 705 may include components for bi-directional voice and data communications including components for transmitting and receiving communications, including a communication manager 710, a transceiver 715, an antenna 720, memory 725, and a processor 735. These components may be in electronic communication via one or more buses (e.g., bus 740).

The communication manager 710 may determine, at the UE, a recommended configuration for a configured grant that is to be received, at least in part, via radio resource control messaging, transmit, to a base station, one or more messages indicating the recommended configuration for the configured grant at the UE, the one or more messages including at least one of a configured grant-specific scheduling request or a configured grant-specific control element, at least one of the configured grant-specific scheduling request or the configured grant-specific control element being formatted for association with grants that are received, at least in part, via radio resource control messaging, and receive, from the base station, a configuration for the configured grant based on the recommended configuration.

The transceiver 715 may communicate bi-directionally, via one or more antennas, wired, or wireless links as described above. For example, the transceiver 715 may represent a wireless transceiver and may communicate bi-directionally with another wireless transceiver. The transceiver 715 may also include a modem to modulate the packets and provide the modulated packets to the antennas for transmission, and to demodulate packets received from the antennas.

In some cases, the wireless device may include a single antenna 720. However, in some cases the device may have more than one antenna 720, which may be capable of concurrently transmitting or receiving multiple wireless transmissions.

The memory 725 may include random access memory (RAM) and read only memory (ROM). The memory 725 may store computer-readable, computer-executable code 730 including instructions that, when executed, cause the processor to perform various functions described herein. In some cases, the memory 725 may contain, among other things, a basic I/O system (BIOS) which may control basic hardware or software operation such as the interaction with peripheral components or devices.

The code 730 may include instructions to implement aspects of the present disclosure, including instructions to support wireless communications. The code 730 may be stored in a non-transitory computer-readable medium such as system memory or other type of memory. In some cases, the code 730 may not be directly executable by the processor 735 but may cause a computer (e.g., when compiled and executed) to perform functions described herein.

The processor 735 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 735 may be configured to operate a memory array using a memory controller. In other cases, a memory controller may be integrated into the processor 735. The processor 735 may be configured to execute computer-readable instructions stored in a memory (e.g., the memory 725) to cause the device 705 to perform various functions (e.g., functions or tasks supporting a configured grant scheduling request).

Figure 8:
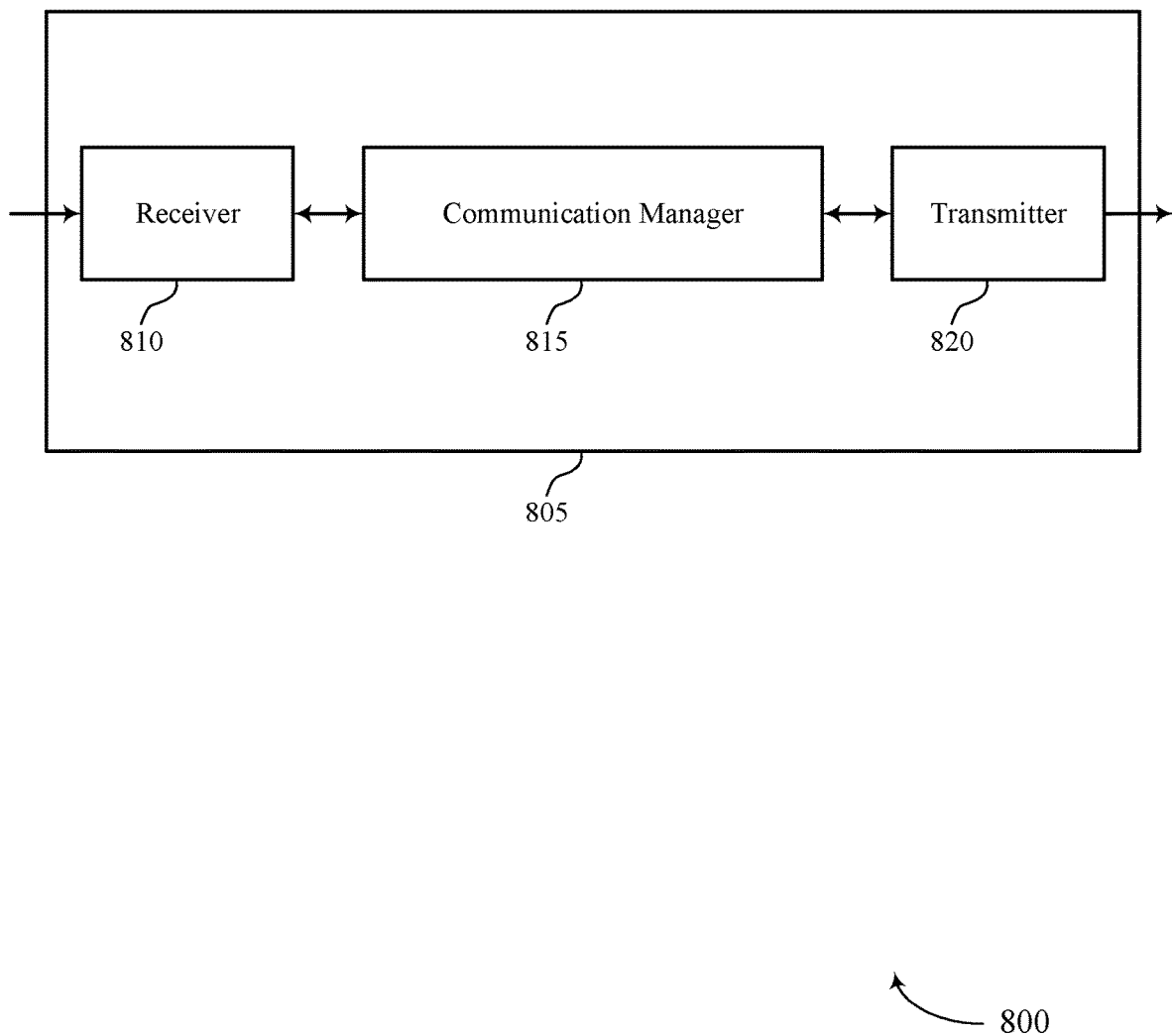
FIGS. 8 and 9 show block diagrams of devices that support a configured grant scheduling request in accordance with aspects of the present disclosure.

FIG. 8 shows a block diagram 800 of a device 805 that supports a configured grant scheduling request in accordance with aspects of the present disclosure. The device 805 may be an example of aspects of a base station 105 as described herein. The device 805 may include a receiver 810, a communication manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to a configured grant scheduling request, etc.). Information may be passed on to other components of the device 805. The receiver 810 may be an example of aspects of the transceiver 1120 described with reference to FIG. 11. The receiver 810 may utilize a single antenna or a set of antennas.

The communication manager 815 may receive, from a UE, one or more messages indicating a recommended configuration for a configured grant to be transmitted to the UE, at least in part, via radio resource control messaging, the one or more messages including at least one of a configured grant-specific scheduling request or a configured grant-specific control element, the at least one of the configured grant-specific scheduling request or the configured grant-specific control element being formatted for association with grants that are transmitted, at least in part, via radio resource control messaging and transmit, to the UE, a configuration for the configured grant based on the recommended configuration. The communication manager 815 may be an example of aspects of the communication manager 1110 described herein.

The communication manager 815, or its sub-components, may be implemented in hardware, code (e.g., software or firmware) executed by a processor, or any combination thereof. If implemented in code executed by a processor, the functions of the communication manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 815, or its sub-components, may be physically located at various positions, including being distributed such that portions of functions are implemented at different physical locations by one or more physical components. In some examples, the communication manager 815, or its sub-components, may be a separate and distinct component in accordance with various aspects of the present disclosure. In some examples, the communication manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
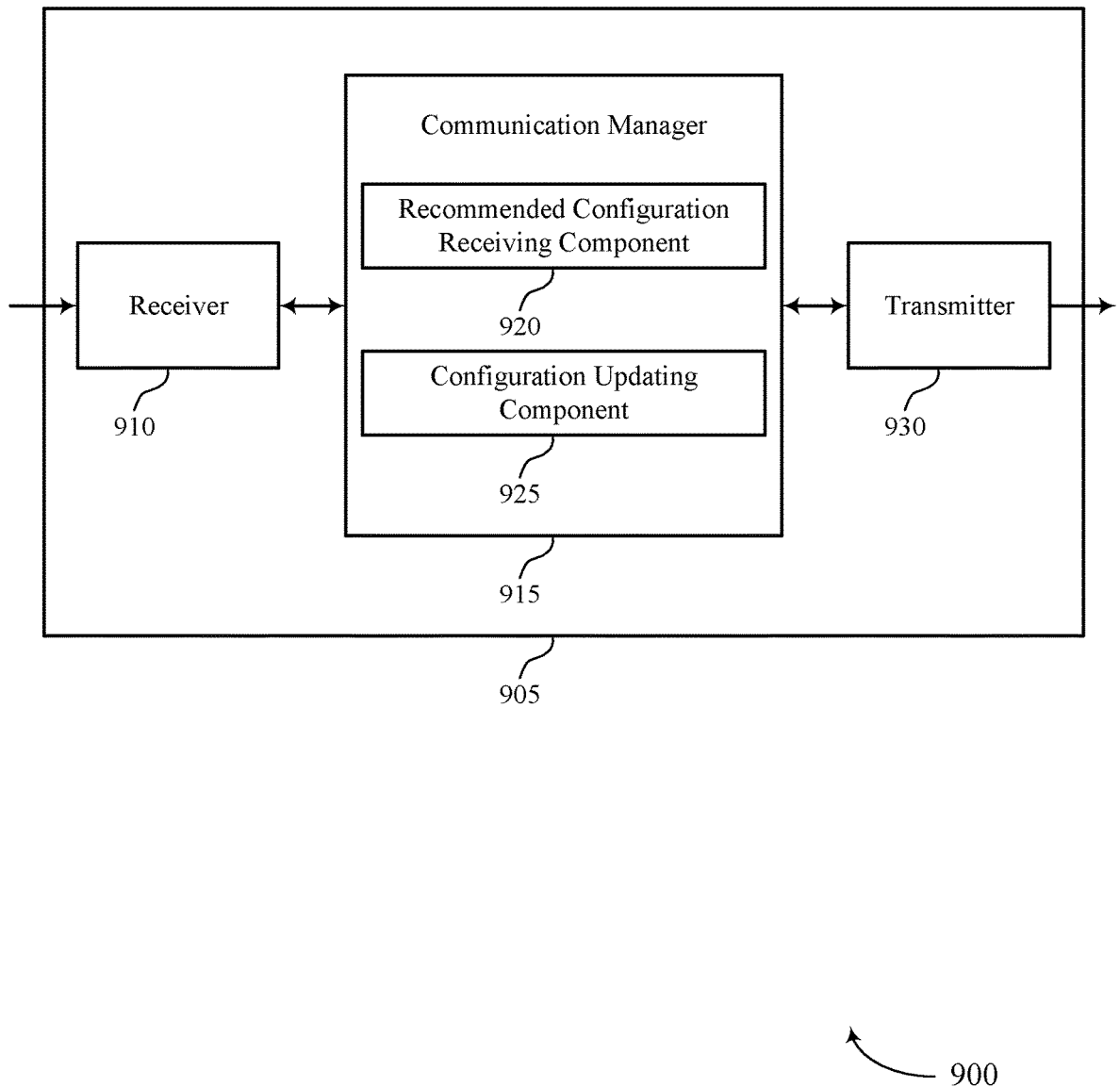

FIG. 9 shows a block diagram 900 of a device 905 that supports a configured grant scheduling request in accordance with aspects of the present disclosure. The device 905 may be an example of aspects of a device 805, or a base station 105 as described herein. The device 905 may include a receiver 910, a communication manager 915, and a transmitter 930. The device 905 may also include a processor.

Each of these components may be in communication with one another (e.g., via one or more buses).

The receiver 910 may receive information such as packets, user data, or control information associated with various information channels (e.g., control channels, data channels, and information related to a configured grant scheduling request, etc.). Information may be passed on to other components of the device 905. The receiver 910 may be an example of aspects of the transceiver 1120 described with reference to FIG. 11. The receiver 910 may utilize a single antenna or a set of antennas.

The communication manager 915 may be an example of aspects of the communication manager 815 as described herein. The communication manager 915 may include a recommended configuration receiving component 920 and a configuration updating component 925. The communication manager 915 may be an example of aspects of the communication manager 1110 described herein.

The recommended configuration receiving component 920 may receive, from a UE, one or more messages indicating a recommended configuration for a configured grant to be transmitted to the UE, at least in part, via radio resource control messaging, the one or more messages including at least one of a configured grant-specific scheduling request or a configured grant-specific control element, the at least one of the configured grant-specific scheduling request or the configured grant-specific control element being formatted for association with grants that are transmitted, at least in part, via radio resource control messaging.

The configuration updating component 925 may transmit, to the UE, a configuration for the configured grant based on the recommended configuration.

The transmitter 930 may transmit signals generated by other components of the device 905. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of antennas.

Figure 10:
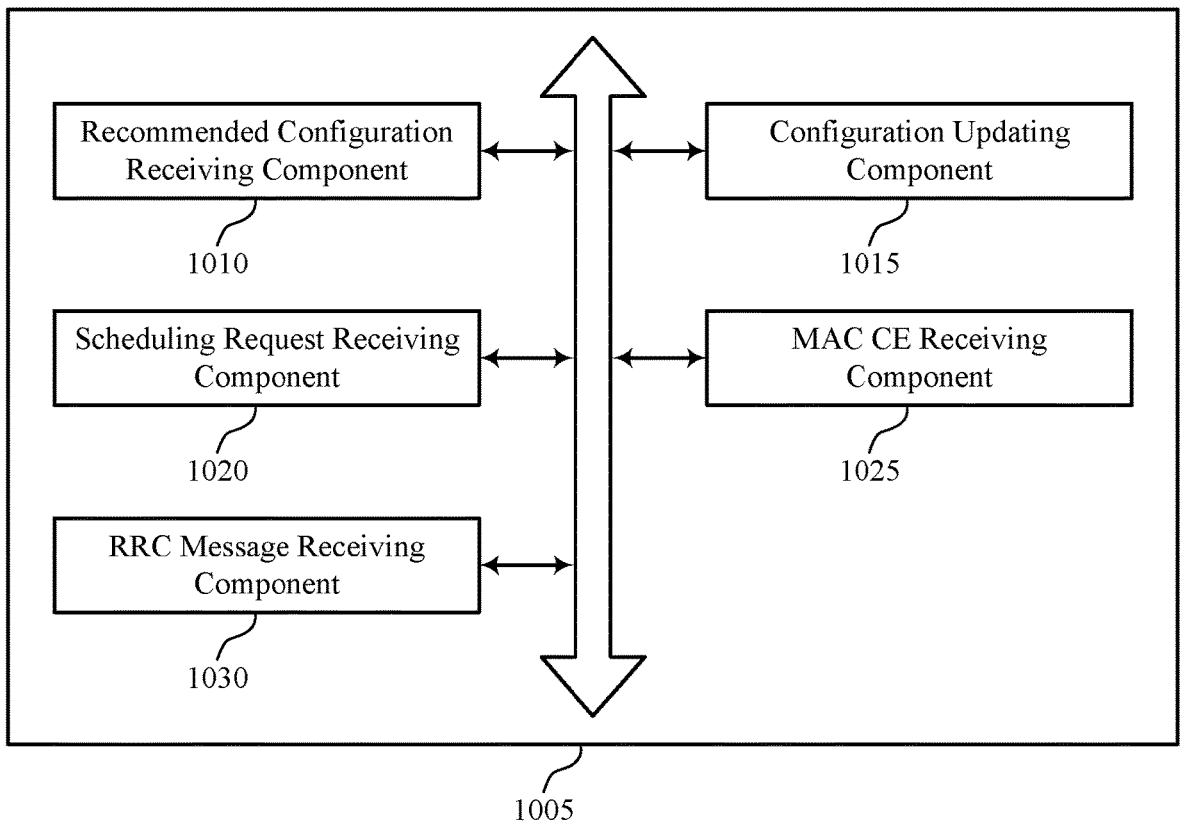
FIG. 10 shows a block diagram of a communication manager that supports a configured grant scheduling request in accordance with aspects of the present disclosure.

FIG. 10 shows a block diagram 1000 of a communication manager 1005 that supports a configured grant scheduling request in accordance with aspects of the present disclosure. The communication manager 1005 may be an example of aspects of a communication manager 815, a communication manager 915, or a communication manager 1110 described herein. The communication manager 1005 may include a recommended configuration receiving component 1010, a configuration updating component 1015, a scheduling request receiving component 1020, a MAC CE receiving component 1025, and a RRC message receiving component 1030. Each of these modules may communicate, directly or indirectly, with one another (e.g., via one or more buses).

The recommended configuration receiving component 1010 may receive, from a UE, one or more messages indicating a recommended configuration for a configured grant to be transmitted to the UE, at least in part, via radio resource control messaging, the one or more messages including at least one of a configured grant-specific scheduling request or a configured grant-specific control element, the at least one of the configured grant-specific scheduling request or the configured grant-specific control element being formatted for association with grants that are transmitted, at least in part, via radio resource control messaging.

The configuration updating component 1015 may transmit, to the UE, a configuration for the configured grant based on the recommended configuration. In some examples, the configuration updating component 1015 may transmit, to the UE, an indication to activate the configured grant. In some examples, the configuration updating component 1015 may transmit, to the UE, an indication to modify the configured grant based on the recommended configuration for the configured grant. In some examples, the configuration updating component 1015 may deactivate the configured grant based on the indication to modify the configured grant. In some examples, the configuration updating component 1015 may reactivate the configured grant based on the recommended configuration for the configured grant. In some examples, the configuration updating component 1015 may transmit, to the UE, an indication to deactivate the configured grant.

In some cases, the recommended configuration for the configured grant includes an explicit request to deactivate the configured grant. In some cases, the recommended configuration for the configured grant includes an implicit request to deactivate the configured grant based on a zero grant size, a periodicity for the configured grant, or both.

The scheduling request receiving component 1020 may receive the configured grant-specific scheduling request indicating the recommended configuration for the configured grant, the configured grant-specific scheduling request being formatted for association with grants that are transmitted, at least in part, via radio resource control messaging.

In some examples, the scheduling request receiving component 1020 may receive a MAC CE including the recommended configuration, where the configured grant-specific scheduling request indicates the MAC CE is associated with the configured grant. In some cases, a payload for the configured grant-specific scheduling request includes the recommended configuration for the configured grant. In some cases, the MAC CE indicates an index of a recommended configured grant table corresponding to the recommended configuration.

The MAC CE receiving component 1025 may receive a configured grant-specific MAC CE indicating the recommended configuration for the configured grant, where the configured grant-specific MAC CE is the configured grant-specific control element, and where the configured grant-specific MAC CE is formatted for association with grants that are transmitted, at least in part, via radio resource control messaging.

In some examples, the MAC CE receiving component 1025 may receive a scheduling request, where the configured grant-specific MAC CE indicates the scheduling request corresponds to the configured grant. In some examples, the MAC CE receiving component 1025 may identify an index of a recommended configured grant table corresponding to the recommended configuration, where the configured grant-specific MAC CE includes the index. In some cases, the configured grant-specific MAC CE includes an identifier for one or more logical channel groups corresponding to the configured grant, an index corresponding to the configured grant, a recommended grant size for the configured grant, a recommended periodicity for the configured grant, or any combination thereof.

In some cases, the configured grant-specific MAC CE includes a set of indices of the recommended configured grant table including at least the index. In some cases, each index of the recommended configured grant table corresponds to a configured grant configuration with a grant size per configured grant occasion, a configured grant periodicity, a type of traffic, or any combination thereof.

The RRC message receiving component 1030 may receive a radio resource control message indicating the recommended configuration for the configured grant. In some cases, the radio resource control message includes UE assistance information associated with the configured grant.

Figure 11:
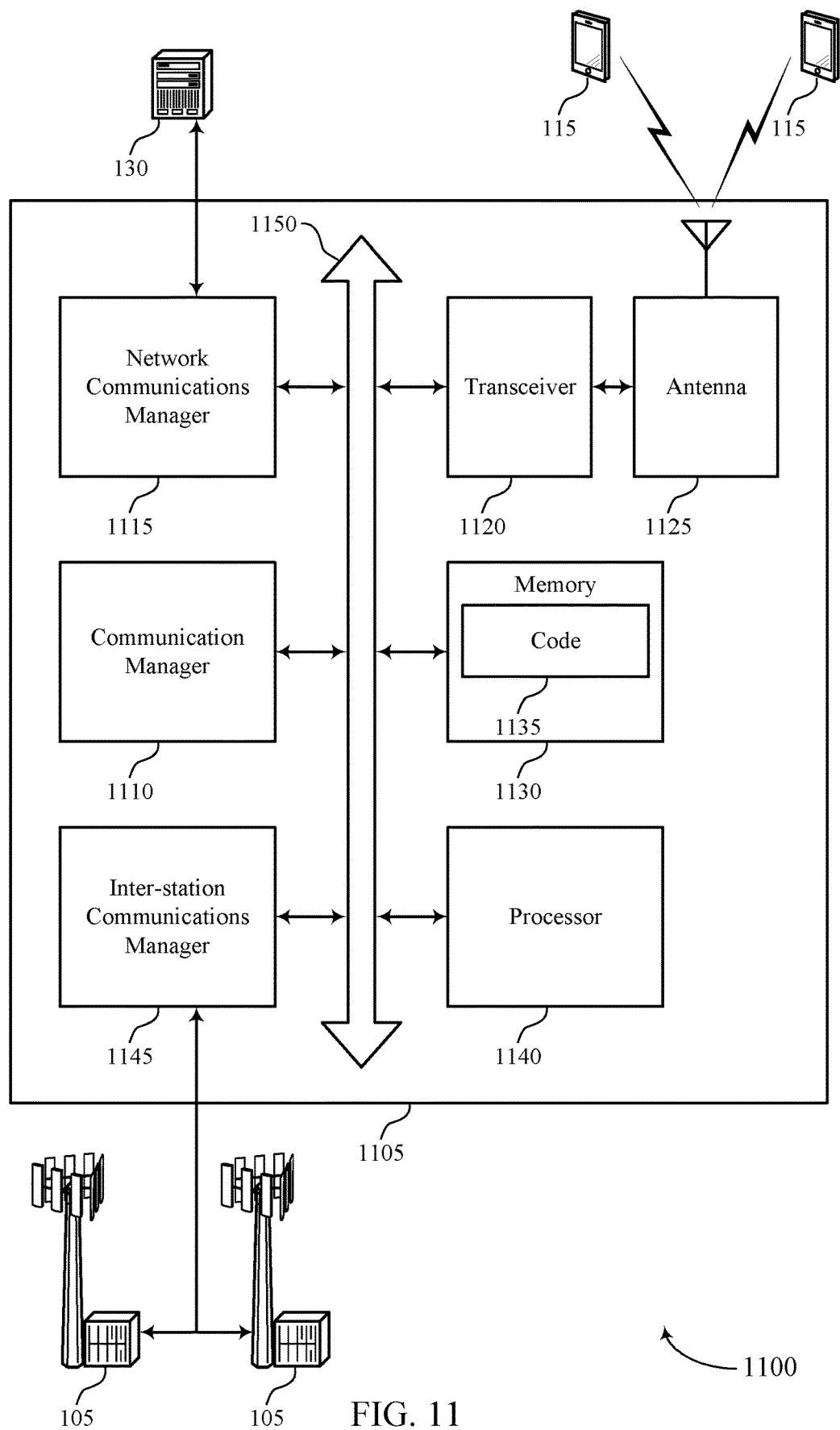
FIG. 11 shows a diagram of a system including a device that supports a configured grant scheduling request in accordance with aspects of the present disclosure.

FIG. 11 shows a diagram of a system 1100 including a device 1105 that supports a configured grant scheduling request in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communication manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communication manager 1110 may receive, from a UE, one or more messages indicating a recommended configuration for a configured grant to be transmitted to the UE, at least in part, via radio resource control messaging, the one or more messages including at least one of a configured grant-specific scheduling request or a configured grant-specific control element, the at least one of the configured grant-specific scheduling request or the configured grant-specific control element being formatted for association with grants that are transmitted, at least in part, via radio resource control messaging and transmit, to the UE, a configuration for the configured grant based on the recommended configuration.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting a configured grant scheduling request).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

Figure 12:
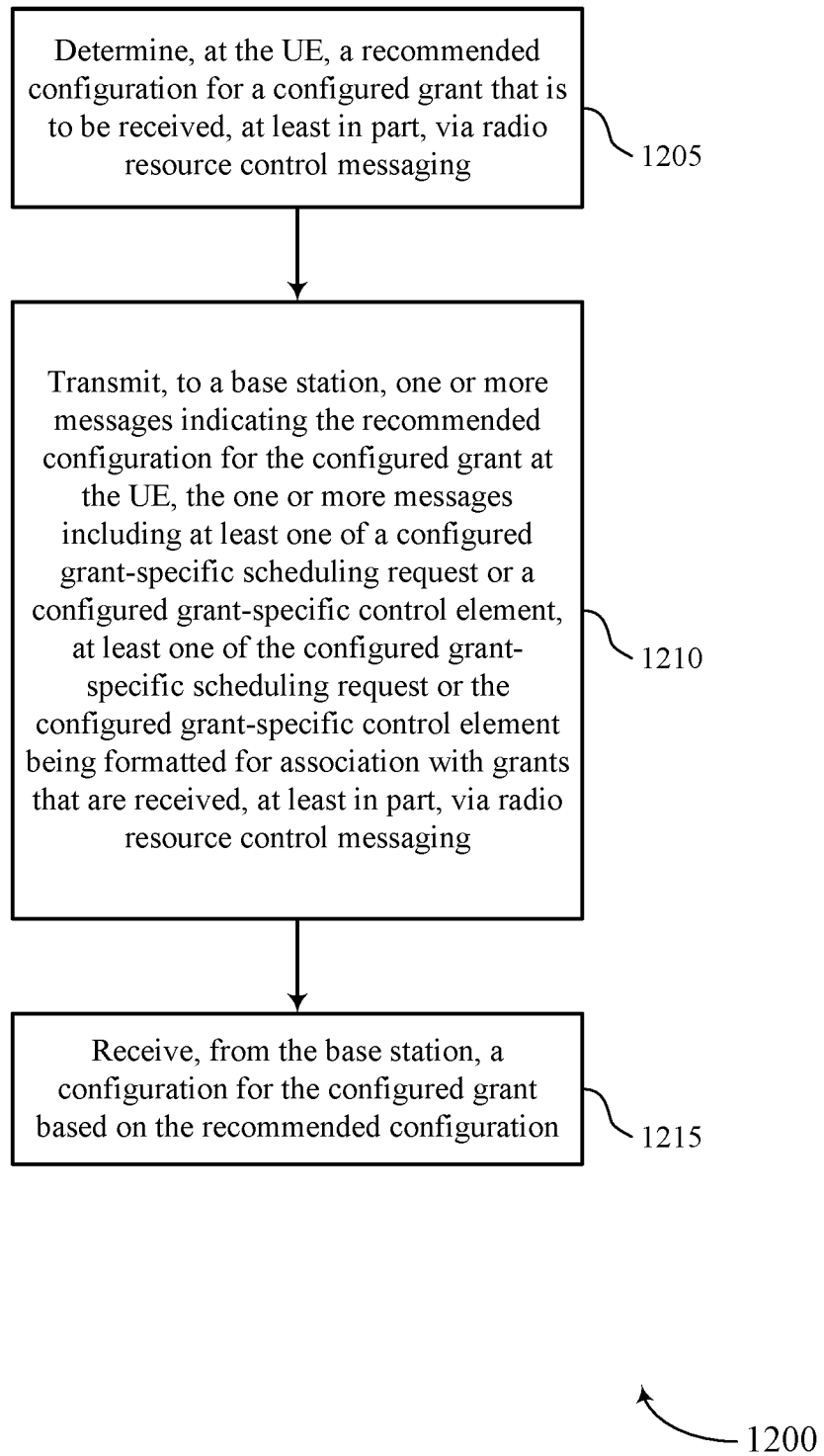
FIGS. 12 through 15 show flowcharts illustrating methods that support a configured grant scheduling request in accordance with aspects of the present disclosure.

FIG. 12 shows a flowchart illustrating a method 1200 that supports a configured grant scheduling request in accordance with aspects of the present disclosure. The operations of method 1200 may be implemented by a UE 115 or its components as described herein. For example, the operations of method 1200 may be performed by a communication manager as described with reference to FIGS. 4 through 7. In some examples, a UE may execute a set of instructions to control the functional elements of the UE to perform the described functions. Additionally or alternatively, a UE may perform aspects of the described functions using special-purpose hardware.

At 1205, the UE may determine, at the UE, a recommended configuration for a configured grant that is to be received, at least in part, via radio resource control messaging. The operations of 1205 may be performed according to the methods described herein. In some examples, aspects of the operations of 1205 may be performed by a recommended configuration component as described with reference to FIGS. 4 through 7.

At 1210, the UE may transmit, to a base station, one or more messages indicating the recommended configuration for the configured grant at the UE, the one or more messages including at least one of a configured grant-specific scheduling request or a configured grant-specific control element, at least one of the configured grant-specific scheduling request or the configured grant-specific control element being formatted for association with grants that are received, at least in part, via radio resource control messaging. The operations of 1210 may be performed according to the methods described herein. In some examples, aspects of the operations of 1210 may be performed by a recommendation indication component as described with reference to FIGS. 4 through 7.

At 1215, the UE may receive, from the base station, a configuration for the configured grant based on the recommended configuration. The operations of 1215 may be performed according to the methods described herein. In some examples, aspects of the operations of 1215 may be performed by an updated configuration receiving component as described with reference to FIGS. 4 through 7.

Figure 13:
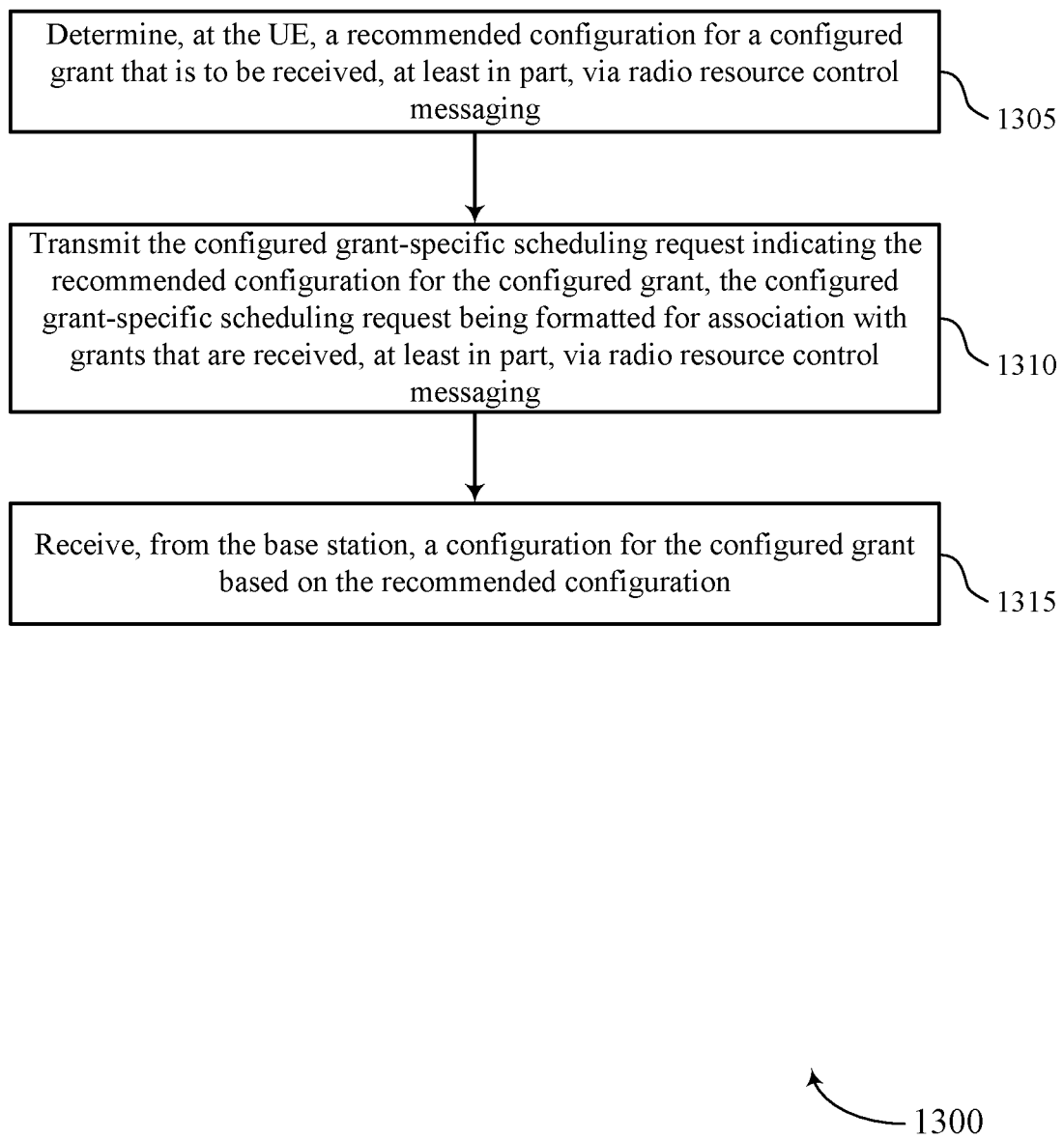

FIG. 13 shows a flowchart illustrating a method 1300 that supports a configured grant scheduling request in accordance with aspects of the present disclosure. The operations of method 1300 may be implemented by a UE 115 or its components as described herein. For example, the operations of method 1300 may be performed by a communication manager as described with reference to FIGS. 4 through 7. In some examples, a UE may execute a set of instructions to control the functional elements of the UE to perform the described functions. Additionally or alternatively, a UE may perform aspects of the described functions using special-purpose hardware.

At 1305, the UE may determine, at the UE, a recommended configuration for a configured grant that is to be received, at least in part, via radio resource control messaging. The operations of 1305 may be performed according to the methods described herein. In some examples, aspects of the operations of 1305 may be performed by a recommended configuration component as described with reference to FIGS. 4 through 7.

At 1310, the UE may transmit the configured grant-specific scheduling request indicating the recommended configuration for the configured grant, the configured grant-specific scheduling request being formatted for association with grants that are received, at least in part, via radio resource control messaging. The operations of 1310 may be performed according to the methods described herein. In some examples, aspects of the operations of 1310 may be performed by a scheduling request transmitting component as described with reference to FIGS. 4 through 7.

At 1315, the UE may receive, from the base station, a configuration for the configured grant based on the recommended configuration. The operations of 1315 may be performed according to the methods described herein. In some examples, aspects of the operations of 1315 may be performed by an updated configuration receiving component as described with reference to FIGS. 4 through 7.

Figure 14:
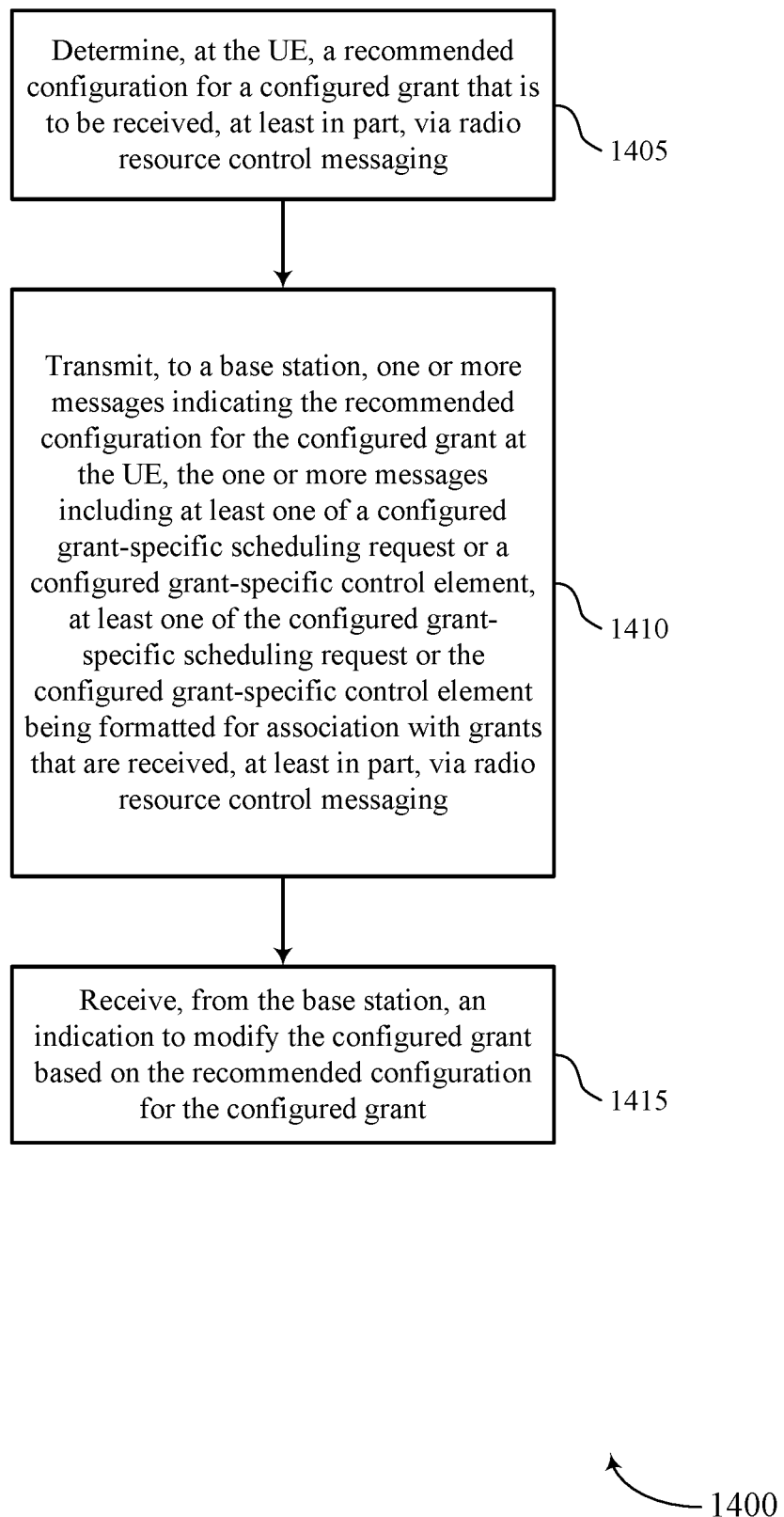

FIG. 14 shows a flowchart illustrating a method 1400 that supports a configured grant scheduling request in accordance with aspects of the present disclosure. The operations of method 1400 may be implemented by a UE 115 or its components as described herein. For example, the operations of method 1400 may be performed by a communication manager as described with reference to FIGS. 4 through 7. In some examples, a UE may execute a set of instructions to control the functional elements of the UE to perform the described functions. Additionally or alternatively, a UE may perform aspects of the described functions using special-purpose hardware.

At 1405, the UE may determine, at the UE, a recommended configuration for a configured grant that is to be received, at least in part, via radio resource control messaging. The operations of 1405 may be performed according to the methods described herein. In some examples, aspects of the operations of 1405 may be performed by a recommended configuration component as described with reference to FIGS. 4 through 7.

At 1410, the UE may transmit, to a base station, one or more messages indicating the recommended configuration for the configured grant at the UE, the one or more messages including at least one of a configured grant-specific scheduling request or a configured grant-specific control element, at least one of the configured grant-specific scheduling request or the configured grant-specific control element being formatted for association with grants that are received, at least in part, via radio resource control messaging. The operations of 1410 may be performed according to the methods described herein. In some examples, aspects of the operations of 1410 may be performed by a recommendation indication component as described with reference to FIGS. 4 through 7.

At 1415, the UE may receive, from the base station, an indication to modify the configured grant based on the recommended configuration for the configured grant. The operations of 1415 may be performed according to the methods described herein. In some examples, aspects of the operations of 1415 may be performed by an updated configuration receiving component as described with reference to FIGS. 4 through 7.

Figure 15:
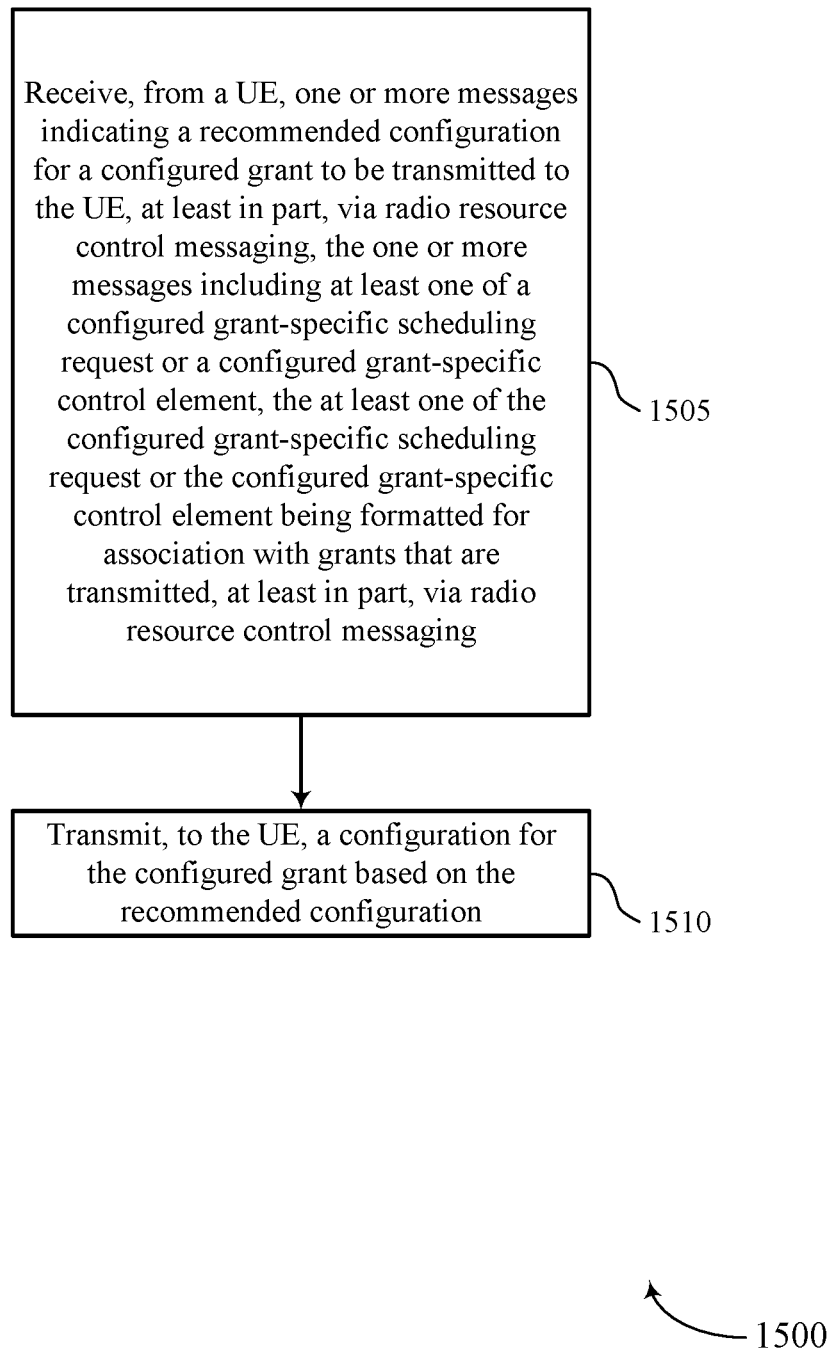

FIG. 15 shows a flowchart illustrating a method 1500 that supports a configured grant scheduling request in accordance with aspects of the present disclosure. The operations of method 1500 may be implemented by a base station 105 or its components as described herein. For example, the operations of method 1500 may be performed by a communication manager as described with reference to FIGS. 8 through 11. In some examples, a base station may execute a set of instructions to control the functional elements of the base station to perform the described functions. Additionally or alternatively, a base station may perform aspects of the described functions using special-purpose hardware.

At 1505, the base station may receive, from a UE, one or more messages indicating a recommended configuration for a configured grant to be transmitted to the UE, at least in part, via radio resource control messaging, the one or more messages including at least one of a configured grant-specific scheduling request or a configured grant-specific control element, the at least one of the configured grant-specific scheduling request or the configured grant-specific control element being formatted for association with grants that are transmitted, at least in part, via radio resource control messaging. The operations of 1505 may be performed according to the methods described herein. In some examples, aspects of the operations of 1505 may be performed by a recommended configuration receiving component as described with reference to FIGS. 8 through 11.

At 1510, the base station may transmit, to the UE, a configuration for the configured grant based on the recommended configuration. The operations of 1510 may be performed according to the methods described herein. In some examples, aspects of the operations of 1510 may be performed by a configuration updating component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Example 1: A method for wireless communications at a user equipment (UE), comprising: determining, at the UE, a recommended configuration for a configured grant that is to be received, at least in part, via radio resource control messaging; transmitting, to a base station, one or more messages indicating the recommended configuration for the configured grant at the UE, the one or more messages comprising at least one of a configured grant-specific scheduling request or a configured grant-specific control element, at least one of the configured grant-specific scheduling request or the configured grant-specific control element being formatted for association with grants that are received, at least in part, via radio resource control messaging; and receiving, from the base station, a configuration for the configured grant based at least in part on the recommended configuration.

Example 2: The method of example 1, wherein transmitting the one or more messages indicating the recommended configuration comprises: transmitting the configured grant-specific scheduling request indicating the recommended configuration for the configured grant, the configured grant-specific scheduling request being formatted for association with the grants that are received, at least in part, via radio resource control messaging.

Example 3: The method of example 2, wherein a payload for the configured grant-specific scheduling request comprises the recommended configuration for the configured grant.

Example 4: The method of example 2, further comprising: transmitting a medium access control (MAC) control element (CE) comprising the recommended configuration, wherein the configured grant-specific scheduling request indicates the MAC CE is associated with the configured grant.

Example 5: The method of example 4, further comprising: the MAC CE indicates an index of a recommended configured grant table corresponding to the recommended configuration.

Example 6: The method of example 2, wherein the configured grant-specific scheduling request is transmitted on an uplink control channel, a random access channel, or both.

Example 7: The method of any of examples 1 through 6, wherein transmitting the one or more messages indicating the recommended configuration comprises: transmitting a configured grant-specific medium access control (MAC) control element (CE) indicating the recommended configuration for the configured grant, wherein the configured grant-specific MAC CE is the configured grant-specific control element, and the configured grant-specific MAC CE is formatted for association with the grants that are received, at least in part, via radio resource control messaging.

Example 8: The method of example 7, wherein the configured grant-specific MAC CE includes an identifier for one or more logical channel groups corresponding to the configured grant, an index corresponding to the configured grant, a recommended grant size for the configured grant, a recommended periodicity for the configured grant, or any combination thereof.

Example 9: The method of any of examples 7 through 8, further comprising: transmitting a scheduling request, wherein the configured grant-specific MAC CE indicates that the scheduling request corresponds to the configured grant.

Example 10: The method of any of examples 7 through 9, further comprising: determining an index of a recommended configured grant table corresponding to the recommended configuration, wherein the configured grant-specific MAC CE includes the index.

Example 11: The method of example 10, wherein the configured grant-specific MAC CE comprises a plurality of indices of the recommended configuration for the recommended configured grant table including at least the index.

Example 12: The method of examples 10 or 11, wherein each index of the recommended configured grant table corresponds to a configured grant configuration with a grant size per configured grant occasion, a configured grant periodicity, a type of traffic, or any combination thereof.

Example 13: The method of any of examples 1 through 12, wherein transmitting the one or more messages indicating the recommended configuration comprises: transmitting a radio resource control message indicating the recommended configuration for the configured grant.

Example 14: The method of example 13, wherein the radio resource control message includes UE assistance information associated with the configured grant.

Example 15: The method of any of examples 1 through 14, wherein receiving the configuration for the configured grant comprises: receiving, from the base station, an indication to activate the configured grant.

Example 16: The method of any of examples 1 through 15, wherein receiving the configuration for the configured grant comprises: receiving, from the base station, an indication to modify the configured grant based at least in part on the recommended configuration for the configured grant.

Example 17: The method of example 16, further comprising: deactivating the configured grant; and reactivating the configured grant based at least in part on the recommended configuration for the configured grant.

Example 18: The method of any of examples 1 through 17, wherein receiving the configuration for the configured grant comprises: receiving, from the base station, an indication to deactivate the configured grant.

Example 19: The method of example 18, wherein the recommended configuration for the configured grant includes an explicit request to deactivate the configured grant.

Example 20: The method of example 18, wherein the recommended configuration for the configured grant includes an implicit request to deactivate the configured grant based at least in part on a zero grant size, a periodicity for the configured grant, or both.

Example 21: A method for wireless communications at a base station, comprising: receiving, from a user equipment (UE), one or more messages indicating a recommended configuration for a configured grant to be transmitted to the UE, at least in part, via radio resource control messaging, the one or more messages comprising at least one of a configured grant-specific scheduling request or a configured grant-specific control element, the at least one of the configured grant-specific scheduling request or the configured grant-specific control element being formatted for association with grants that are transmitted, at least in part, via radio resource control messaging; and transmitting, to the UE, a configuration for the configured grant based at least in part on the recommended configuration.

Example 22: The method of example 21, wherein receiving the one or more messages indicating the recommended configuration comprises: receiving the configured grant-specific scheduling request indicating the recommended configuration for the configured grant, the configured grant-specific scheduling request being formatted for association with grants that are transmitted, at least in part, via radio resource control messaging.

Example 23: The method of example 22, wherein a payload for the configured grant-specific scheduling request comprises the recommended configuration for the configured grant.

Example 24: The method of example 21 through 23, further comprising: receiving a medium access control (MAC) control element (CE) comprising the recommended configuration, wherein the configured grant-specific scheduling request indicates the MAC CE is associated with the configured grant.

Example 25: The method of example 24, wherein the MAC CE indicates an index of a recommended configured grant table corresponding to the recommended configuration.

Example 26: The method of any of examples 21 through 25, wherein receiving the one or more messages indicating the recommended configuration comprises: receiving a configured grant-specific medium access control (MAC) control element (CE) indicating the recommended configuration for the configured grant, wherein the configured grant-specific MAC CE is the configured grant-specific control element, and wherein the configured grant-specific MAC CE is formatted for association with grants that are transmitted, at least in part, via radio resource control messaging.

Example 27: The method of example 26, wherein the configured grant-specific MAC CE includes an identifier for one or more logical channel groups corresponding to the configured grant, an index corresponding to the configured grant, a recommended grant size for the configured grant, a recommended periodicity for the configured grant, or any combination thereof.

Example 28: The method of example 26 or 27, further comprising: receiving a scheduling request, wherein the configured grant-specific MAC CE indicates the scheduling request corresponds to the configured grant.

Example 29: The method of any of examples 21 through 28, further comprising: identifying an index of a recommended configured grant table corresponding to the recommended configuration, wherein the configured grant-specific MAC CE includes the index.

Example 30: The method of example 29, wherein the configured grant-specific MAC CE comprises a plurality of indices of the recommended configured grant table including at least the index.

Example 31: The method of example 29 or 30, wherein each index of the recommended configured grant table corresponds to a configured grant configuration with a grant size per configured grant occasion, a configured grant periodicity, a type of traffic, or any combination thereof.

Example 32: The method of any of examples 21 through 31, wherein receiving the one or more messages indicating the recommended configuration comprises: receiving a radio resource control message indicating the recommended configuration for the configured grant.

Example 33: The method of example 32, wherein the radio resource control message includes UE assistance information associated with the configured grant.

Example 34: The method of any of examples 21 through 33, wherein transmitting the configuration for the configured grant comprises: transmitting, to the UE, an indication to activate the configured grant.

Example 35: The method of any of examples 21 through 34, wherein transmitting the configuration for the configured grant comprises: transmitting, to the UE, an indication to modify the configured grant based at least in part on the recommended configuration for the configured grant.

Example 36: The method of example 35, further comprising: deactivating the configured grant based at least in part on the indication to modify the configured grant; and reactivating the configured grant based at least in part on the recommended configuration for the configured grant.

Example 37: The method of any of examples 21 through 36, wherein transmitting the configuration for the configured grant comprises: transmitting, to the UE, an indication to deactivate the configured grant.

Example 38: The method of any of examples 21 through 37, wherein the recommended configuration for the configured grant includes an explicit request to deactivate the configured grant.

Example 39: The method of example 37, wherein the recommended configuration for the configured grant includes an implicit request to deactivate the configured grant based at least in part on a zero grant size, a periodicity for the configured grant, or both.

Example 40: An apparatus comprising at least one means for performing a method of any of examples 1 to 20.

Example 41: An apparatus for wireless communications comprising a processor; memory coupled with the processor; and instructions stored in the memory and executable by the processor to cause the apparatus to perform a method of any of examples 1 to 20.

Example 42: A non-transitory computer-readable medium storing code for wireless communications, the code comprising instructions executable by a processor to perform a method of any of examples 1 to 20.

Example 43: An apparatus comprising at least one means for performing a method of any of examples 21 to 39.

Example 44: An apparatus for wireless communications comprising a processor; memory coupled with the processor; and instructions stored in the memory and executable by the processor to cause the apparatus to perform a method of any of examples 21 to 39.

Example 45: A non-transitory computer-readable medium storing code for wireless communications, the code comprising instructions executable by a processor to perform a method of any of examples 21 to 39.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   determining, at the UE, a recommended configuration for a configured grant of periodic uplink resources for the UE based at least in part on uplink traffic characteristics at the UE;
   transmitting, to a network entity, one or more messages indicating the recommended configuration for the configured grant, the one or more messages comprising at least one of a configured grant-specific scheduling request or a configured grant-specific control element, at least one of the configured grant-specific scheduling request or the configured grant-specific control element being formatted for association with uplink configured grants; and
   receiving, from the network entity, a configuration for the configured grant based at least in part on the recommended configuration.

2. The method of claim 1, wherein transmitting the one or more messages indicating the recommended configuration comprises:
   transmitting the configured grant-specific scheduling request indicating the recommended configuration for the configured grant, the configured grant-specific scheduling request being formatted for association with uplink configured grants.

3. The method of claim 2, wherein a payload for the configured grant-specific scheduling request comprises the recommended configuration for the configured grant.

4. The method of claim 2, further comprising:
   transmitting a medium access control (MAC) control element (CE) comprising the recommended configuration, wherein the configured grant-specific scheduling request indicates the MAC CE is associated with the configured grant.

5. The method of claim 4, further comprising:
   the MAC CE indicates an index of a recommended configured grant table corresponding to the recommended configuration.

6. The method of claim 2, wherein the configured grant-specific scheduling request is transmitted on an uplink control channel, a random access channel, or both.

7. The method of claim 1, wherein transmitting the one or more messages indicating the recommended configuration comprises:
   transmitting a configured grant-specific medium access control (MAC) control element (CE) indicating the recommended configuration for the configured grant, wherein the configured grant-specific MAC CE is the configured grant-specific control element, and the configured grant-specific MAC CE is formatted for association with uplink configured grants.

8. The method of claim 7, wherein the configured grant-specific MAC CE includes an identifier for one or more logical channel groups corresponding to the configured grant, an index corresponding to the configured grant, a recommended grant size for the configured grant, a recommended periodicity for the configured grant, or any combination thereof.

9. The method of claim 7, further comprising:
transmitting a scheduling request, wherein the configured grant-specific MAC CE indicates that the scheduling request corresponds to the configured grant.

10. The method of claim 7, further comprising:
determining an index of a recommended configured grant table corresponding to the recommended configuration, wherein the configured grant-specific MAC CE includes the index.

11. The method of claim 10, wherein the configured grant-specific MAC CE comprises a plurality of indices of the recommended configuration for the recommended configured grant table including at least the index.

12. The method of claim 10, wherein each index of the recommended configured grant table corresponds to a configured grant configuration with a grant size per configured grant occasion, a configured grant periodicity, a type of traffic, or any combination thereof.

13. The method of claim 1, wherein transmitting the one or more messages indicating the recommended configuration comprises:
transmitting a radio resource control message indicating the recommended configuration for the configured grant.

14. The method of claim 13, wherein the radio resource control message includes UE assistance information associated with the configured grant.

15. The method of claim 1, wherein receiving the configuration for the configured grant comprises:
receiving, from the network entity, an indication to activate the configured grant.

16. The method of claim 1, wherein receiving the configuration for the configured grant comprises:
receiving, from the network entity, an indication to modify the configured grant based at least in part on the recommended configuration for the configured grant.

17. The method of claim 16, further comprising:
deactivating the configured grant; and
reactivating the configured grant based at least in part on the recommended configuration for the configured grant.

18. The method of claim 1, wherein receiving the configuration for the configured grant comprises:
receiving, from the network entity, an indication to deactivate the configured grant.

19. The method of claim 18, wherein the recommended configuration for the configured grant includes an explicit request to deactivate the configured grant.

20. The method of claim 18, wherein the recommended configuration for the configured grant includes an implicit request to deactivate the configured grant based at least in part on a zero grant size, a periodicity for the configured grant, or both.

21. An apparatus for wireless communications at a user equipment (UE), comprising:
a processor,
memory coupled with the processor, and
instructions stored in the memory and executable by the processor to cause the apparatus to:
determine, at the UE, a recommended configuration for a configured grant of periodic uplink resources for the UE based at least in part on uplink traffic characteristics at the UE;
transmit, to a network entity, one or more messages indicating the recommended configuration for the configured grant, the one or more messages comprising at least one of a configured grant-specific scheduling request or a configured grant-specific control element, at least one of the configured grant-specific scheduling request or the configured grant-specific control element being formatted for association with uplink configured grants; and
receive, from the network entity, a configuration for the configured grant based at least in part on the recommended configuration.

22. The apparatus of claim 21, wherein the instructions to transmit the one or more messages indicating the recommended configuration are executable by the processor to cause the apparatus to:
transmit the configured grant-specific scheduling request indicating the recommended configuration for the configured grant, the configured grant-specific scheduling request being formatted for association with uplink configured grants.

23. The apparatus of claim 22, wherein the instructions are further executable by the processor to cause the apparatus to:
transmit a medium access control (MAC) control element (CE) comprising the recommended configuration, wherein the configured grant-specific scheduling request indicates the MAC CE is associated with the configured grant.

24. The apparatus of claim 23, wherein the instructions are further executable by the processor to cause the apparatus to:
the MAC CE indicate an index of a recommended configured grant table corresponding to the recommended configuration.

25. The apparatus of claim 21, wherein the instructions to transmit the one or more messages indicating the recommended configuration are executable by the processor to cause the apparatus to:
transmit a configured grant-specific medium access control (MAC) control element (CE) indicating the recommended configuration for the configured grant, wherein the configured grant-specific MAC CE is the configured grant-specific control element, and the configured grant-specific MAC CE is formatted for association with uplink configured grants.

26. The apparatus of claim 25, wherein the configured grant-specific MAC CE includes an identifier for one or more logical channel groups corresponding to the configured grant, an index corresponding to the configured grant, a recommended grant size for the configured grant, a recommended periodicity for the configured grant, or any combination thereof.

27. The apparatus of claim 25, wherein the instructions are further executable by the processor to cause the apparatus to:
transmit a scheduling request, wherein the configured grant-specific MAC CE indicates that the scheduling request corresponds to the configured grant.

28. The apparatus of claim 25, wherein the instructions are further executable by the processor to cause the apparatus to:

determine an index of a recommended configured grant table corresponding to the recommended configuration, wherein the configured grant-specific MAC CE includes the index.

29. An apparatus for wireless communications at a user equipment (UE), comprising:
  means for determining, at the UE, a recommended configuration for a configured grant of periodic uplink resources for the UE based at least in part on uplink traffic characteristics at the UE;
  means for transmitting, to a network entity, one or more messages indicating the recommended configuration for the configured grant, the one or more messages comprising at least one of a configured grant-specific scheduling request or a configured grant-specific control element, at least one of the configured grant-specific scheduling request or the configured grant-specific control element being formatted for association with uplink configured grants;
  means for receiving, from the network entity, a configuration for the configured grant based at least in part on the recommended configuration.

30. A non-transitory computer-readable medium storing code for wireless communications at a user equipment (UE), the code comprising instructions executable by a processor to:
  determine, at the UE, a recommended configuration for a configured grant that is to be received, at least in part, via radio resource control messaging of periodic uplink resources for the UE based at least in part on uplink traffic characteristics at the UE;
  transmit, to a network entity, one or more messages indicating the recommended configuration for the configured grant, the one or more messages comprising at least one of a configured grant-specific scheduling request or a configured grant-specific control element, at least one of the configured grant-specific scheduling request or the configured grant-specific control element being formatted for association with uplink configured grants; and
  receive, from the network entity, a configuration for the configured grant based at least in part on the recommended configuration.

\* \* \* \* \*